(12) United States Patent
Imai et al.

(10) Patent No.: US 6,744,968 B1
(45) Date of Patent: Jun. 1, 2004

(54) METHOD AND SYSTEM FOR PROCESSING CLIPS

(75) Inventors: Atsushi Imai, Kanagawa (JP); Katsuakira Moriwake, Tokyo (JP); Takeshi Kawamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/396,222

(22) Filed: Sep. 15, 1999

(30) Foreign Application Priority Data

Sep. 17, 1998 (JP) .......................................... 10-263688

(51) Int. Cl.[7] ............................................... H04N 5/76
(52) U.S. Cl. ............................ 386/52; 386/64; 345/723
(58) Field of Search ........................ 386/4, 52, 53–64; 345/723, 724, 725, 726; 360/13; 369/83; H04N 5/76, 9/79, 5/781

(56) References Cited

U.S. PATENT DOCUMENTS

| | | | | |
|---|---|---|---|---|
| 6,154,601 A | * | 11/2000 | Yaegashi et al. | 386/52 |
| 6,195,497 B1 | * | 2/2001 | Nagasaka et al. | 345/327 |
| 6,324,336 B1 | * | 11/2001 | Kanda | 386/52 |
| 6,449,608 B1 | * | 9/2002 | Morita et al. | 386/83 |
| 6,487,360 B1 | * | 11/2002 | Sumiyoshi et al. | 386/52 |

FOREIGN PATENT DOCUMENTS

| | | |
|---|---|---|
| EP | 0 863 510 | 9/1998 |
| EP | 0 917 148 | 5/1999 |

* cited by examiner

Primary Examiner—Thai Tran
(74) Attorney, Agent, or Firm—Frommer Lawrence & Haug LLP; William S. Frommer

(57) ABSTRACT

An editing system for editing a plurality of clips recorded on a random-accessible recording medium includes a clip processing device having a plurality of clip processing layers to execute a predetermined process for the clips, and a hierarchy decision device having a plurality of objects corresponding to the clip processing layers. The hierarchy decision device serves to decide the hierarchy of each clip processing layer by a hierarchical structure which is formed by connecting the objects mutually. The clip processing device performs time management of each clip processing layer. Any processed clip obtained from a first clip processing layer is further processed by a second clip processing layer which is hierarchically above the first clip processing layer. The processed clip obtained from a hierarchically uppermost clip processing layer is outputted as a fat clip.

30 Claims, 12 Drawing Sheets

FIG. 8
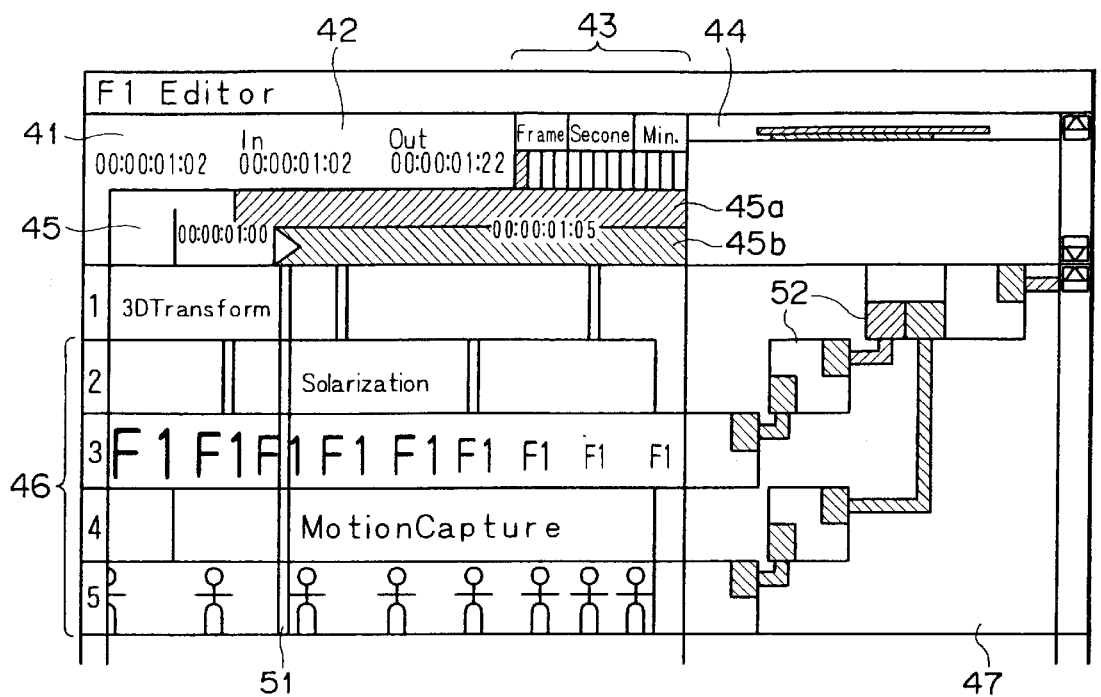
FIG. 9
FIG. 10
| Time Scale | Thumbnail Picture Steps | Show Time Steps | Show Mark |
|---|---|---|---|
| 1Frame | 1 | 5frames | 1 |
| 2Frames | 2 | 10frames | 2 |
| 5Frames | 5 | 1seconds | 5 |
| 10Frames | 10 | 2seconds | 10 |
| 1Second | 30 | 5seconds | 30 |
| 2Seconds | 60 | 10seconds | 60 |
| 5Seconds | 150 | 30seconds | 150 |
| 10Second | 300 | 1minute | 300 |
| 20Seconds | 600 | 2minutes | 600 |
| 1Minute | 1800 | 5minutes | 1800 |
| 2Minutes | 3600 | 10minutes | 3600 |
| 5Minutes | 9000 | 1hour | 9000 |
| 10Minutes | 18000 | 2hours | 18000 |

F I G. 14
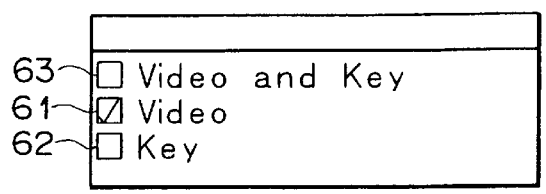
F I G. 15
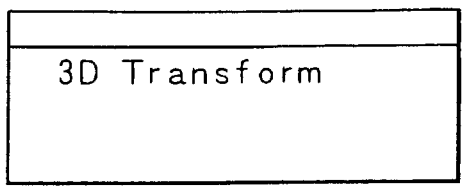
F I G. 16
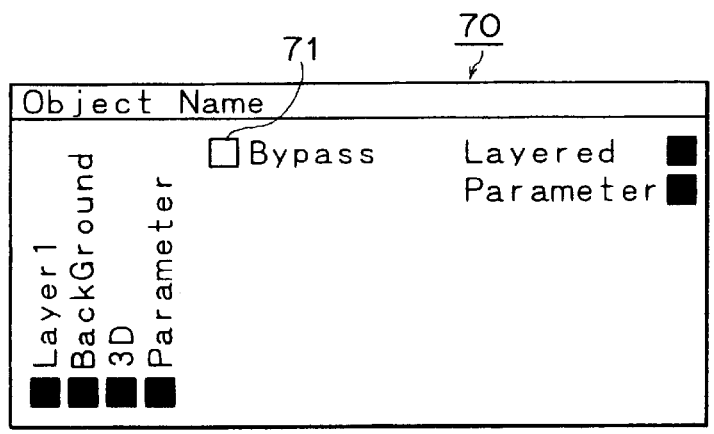
F I G. 17
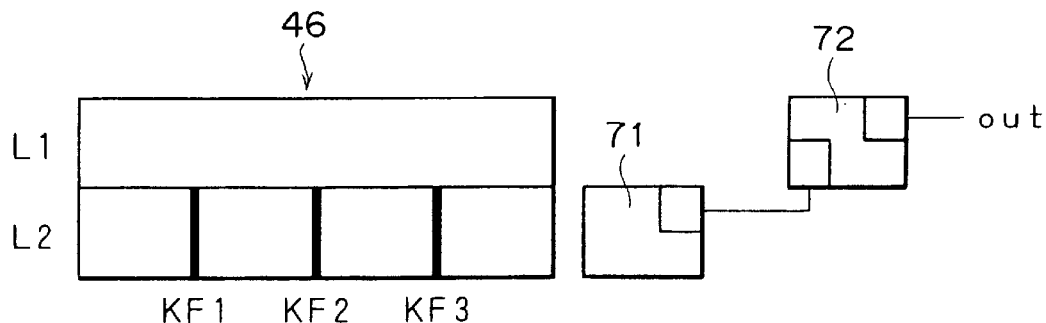

METHOD AND SYSTEM FOR PROCESSING CLIPS

BACKGROUND OF THE INVENTION

The present invention relates to an editing system and an editing method adapted to generate edited video data by image-processing video data of plural channels reproduced from a random-accessible recording medium.

Recently, in the field of post production applied to editing of video data obtained from a video camera, there is known a nonlinear editing system which employs a disk as a recording medium to record material data. A variety of editing processes are executed in this nonlinear editing system, inclusive of a video editing process for generating a desired video program by linking a plurality of materials, a composition process for compositing a plurality of materials by the use of key signal, and a special effect process for giving some special effect to a material. Generally, a video editing process is executed by an editor, a composition process by a video switcher, and a special effect process by a special effector, respectively.

Due to the latest improvements achieved in the random accessibility of disk recording media, it has become possible to access video data of plural channels simultaneously. For this reason, it is highly demanded now to realize an improved editing system which is capable of processing video data of plural channels in real time. For example, regarding the current demands existent in the editing industry to produce commercials for television broadcast or in the editing industry to produce motion picture programs, it is desired that different kinds of editing processes be executed in combination while several tens to several hundreds of materials are edited. It is further demanded to generate high-degree and complicated edited data by repeating different kinds of editing processes so many times.

In order to realize such editing processes, there is proposed an enhanced editing system employing a time line which indicates the contents of the editing processes by a layer structure consisting of multiple layers.

This editing system enables a user to visually grasp with ease the contents of the editing processes by displaying the time line on a monitor and further facilitates the editing itself by means of a pointing device such as a mouse.

However, in such known editing system, it has been impossible by the time line to control the data flow, although possible to control the data values. More specifically, since the content to be processed per layer is previously determined, an executable process per layer is mere control to such predetermined value, and editing with a combination of selected processes per layer is impossible to consequently deteriorate the degree of freedom in editing.

Further, it has been customary heretofore that the entire processes are executed sequentially from the lowermost layer to the uppermost one or vice versa, so that the contents of the processes are limited by the layer structure. In addition, there has been existent another problem that, as the editing process becomes complicated, it is difficult for the user to grasp the contents of the processes with ease.

SUMMARY OF THE INVENTION

It is therefore an object of the present invention to provide an editing system and an editing method which enable a user to visually grasp the editing process with ease for execution of multilayer editing.

And another object of the present invention is to provide a multilayer editing system which is capable of performing fast composition, special effect and editing processes of plural-channel video data supplied as multilayer data.

According to a first aspect of the present invention, there is provided an editing system for editing a plurality of clips recorded on a random-accessible recording medium. The editing system includes a clip processing means having a plurality of clip processing layers to execute a predetermined process for the clips; and a hierarchy decision means having a plurality of objects corresponding to the clip processing layers respectively, and serving to decide the hierarchy of each clip processing layer by one hierarchical structure which is formed by connecting the objects mutually; wherein the clip processing means performs time management of each clip processing layer, and any processed clip obtained from one clip processing layer is further processed by the other clip processing layer which is hierarchically above one clip processing layer, and the processed clip obtained from the hierarchically uppermost clip processing layer is outputted as a fat clip.

According to a second aspect of the present invention, there is provided an editing method of generating an edited fat clip by editing a plurality of clips used as edit units. The editing method includes the steps of executing a predetermined process for the clips by a plurality of clip processing layers; connecting a plurality of objects provided correspondingly to the clip processing layers, and deciding the hierarchy of each clip processing layer by one hierarchical structure formed through such connections of the objects; performing time management of each clip processing layer; and processing the clip, which has already been processed by one clip processing layer, by the other clip processing layer which is hierarchically above one clip processing layer, and outputting, as a fat clip, the processed clip obtained from the hierarchically uppermost clip processing layer.

According to a third aspect of the present invention, there is provided an editing system for generating an edited fat clip by editing a plurality of clips used as edit units. The editing system includes a clip processing means having a plurality of clip processing layers to execute a predetermined process for the clips; a hierarchy decision means having a plurality of objects corresponding to the clip processing layers respectively, and serving to decide the hierarchy of each clip processing layer by one hierarchical structure which is formed by connecting the objects mutually; and an indication means for indicating a desired object; wherein any processed clip obtained from one clip processing layer in the clip processing means is further processed by the other clip processing layer which is hierarchically above one clip processing layer, and the processed content obtained from the clip processing layer corresponding to the indicated object is outputted as an interim fat.

According to a fourth aspect of the present invention, there is provided an editing method of generating an edited fat clip by editing a plurality of clips used as edit units. The editing method includes the steps of executing a predetermined process for the clips by a plurality of clip processing layers; connecting a plurality of objects provided correspondingly to the clip processing layers, and deciding the hierarchy of each clip processing layer by one hierarchical structure formed through such connections of the objects; and processing the clip, which has already been processed by one clip processing layer, by the other clip processing layer which is hierarchically above one clip processing layer, and outputting, as an interim fat, the processed content obtained from the clip processing layer corresponding to the indicated object.

According to a fifth aspect of the present invention, there is provided an editing system for generating an edited fat clip by editing a plurality of clips used as edit units. The editing system includes a clip processing means having a plurality of clip processing layers to execute, with time management, a predetermined process for the subject clips to be edited; a hierarchy decision means having a plurality of objects corresponding to the clip processing layers respectively, and serving to decide the hierarchy of each clip processing layer by one hierarchical structure which is formed by connecting the objects mutually; and an indication means for indicating a desired object or clip processing layer; wherein any processed clip obtained from one clip processing layer in the clip processing means is further processed by the other clip processing layer which is hierarchically above one clip processing layer, and either the processed content obtained from the clip processing layer corresponding to the object indicated by the indication means, or the processed content obtained from the clip processing layer indicated by the indication means, is outputted as a fat clip.

According to a sixth aspect of the present invention, there is provided an editing method of generating an edited fat clip by editing a plurality of clips used as edit units. The editing method includes the steps of executing, with time management, a predetermined process for the subject clips to be edited by a plurality of clip processing layers; connecting a plurality of objects corresponding to the clip processing layers respectively, and deciding the hierarchy of each clip processing layer by one hierarchical structure which is formed through such connections among the objects; processing the clip, which has already been processed by one clip processing layer, by the other clip processing layer which is hierarchically above one clip processing layer; and outputting, as a fat clip, either the processed content obtained from the clip processing layer corresponding to the object indicated by an indication means, or the processed content obtained from the clip processing layer indicated by the indication means.

According to a seventh aspect of the present invention, there is provided an editing system for editing plural-channel video data reproduced from a random-accessible recording medium. The editing system includes a video processing means for processing the plural-channel video data; a display means for displaying a plurality of video clips on multilayers of a time line correspondingly to the plural-channel video data, and also displaying a plurality of objects, which represent the linked state of said plurality of video clips, in such a manner that the objects correspond respectively to the video clips; and a control means for controlling the video processing means in accordance with the linked state represented by the plurality of objects.

According to an eighth aspect of the present invention, there is provided an editing system for editing plural-channel video data reproduced from a random-accessible recording medium. The editing system includes a video processing means for processing the plural-channel video data; a display means for displaying a plurality of video clips on multilayers of a time line correspondingly to the plural-channel video data, and also displaying a plurality of objects, which represent the linked state of the plurality of video clips, in such a manner that the objects correspond respectively to the video clips; and a control means for controlling the timing of reproduction from the random-accessible recording medium in conformity with the positions of the video clips on the time line, and also controlling the video processing means in accordance with the linked state represented by the plurality of objects.

According to a ninth aspect of the present invention, there is provided an editing system for editing plural-channel video data reproduced from a random-accessible recording medium. The editing system includes a video processing means for processing the plural-channel video data; a display means for displaying a plurality of video clips on multilayers of a time line correspondingly to the plural-channel video data, and also displaying a plurality of objects, which represent the linked state of the plurality of video clips, in such a manner that the objects correspond respectively to the video clips; and a means for editing plural-channel source video data reproduced from the random-accessible recording medium in accordance with the linked state represented by the plurality of objects, and then recording the edited video data on the recording medium; wherein the display means displays icons representative of the edited video data correspondingly to the plurality of objects.

According to a tenth aspect of the present invention, there is provided an editing system for editing a plurality of video clips generated from source video data. The editing system includes a reproduction means for reproducing the source video data recorded on a random-accessible recording medium; a video processing means for processing the source video data; and an editing means having a graphical user interface to perform an editing operation, and serving to control the reproduction means and the video processing means in accordance with the manipulating operation in the graphical user interface; wherein the graphical user interface includes a time line of a multilayer structure for compositing a plurality of video clips generated from the source video data and assigning the video clips to the layers, and also includes an object area for displaying a plurality of objects which represent the linked state of the plurality of video clips; and the objects are icons to indicate the process of composition to be executed by the use of the video clips assigned to the layers.

The above and other features and advantages of the present invention will become apparent from the following description which will be given with reference to the illustrative accompanying drawings.

BRIEF DESCRIPTION OF THE DRAWINGS

FIG. 8 is a diagram for explaining an editor window in the menu window;

FIG. 9 is a diagram for explaining a run control window with a function to adjust a current time bar displayed in the editor window;

FIG. 10 shows a time scale for explaining display steps per unit time;

FIG. 14 is a diagram for explaining a dialog box of a signal supplied to an input connector;

FIG. 15 is a diagram for explaining a dialog box in a case where the signal supplied to the input connector is a parameter;

FIG. 16 is a diagram for explaining an object dialog box which indicates the property of an object;

FIG. 17 shows an exemplary configuration of a time line and objects;

DESCRIPTION OF THE PREFERRED EMBODIMENTS

Hereinafter some preferred embodiments of the present invention will be described with reference to the accompanying drawings.

1. General Configuration of Editing System

Figure 1:
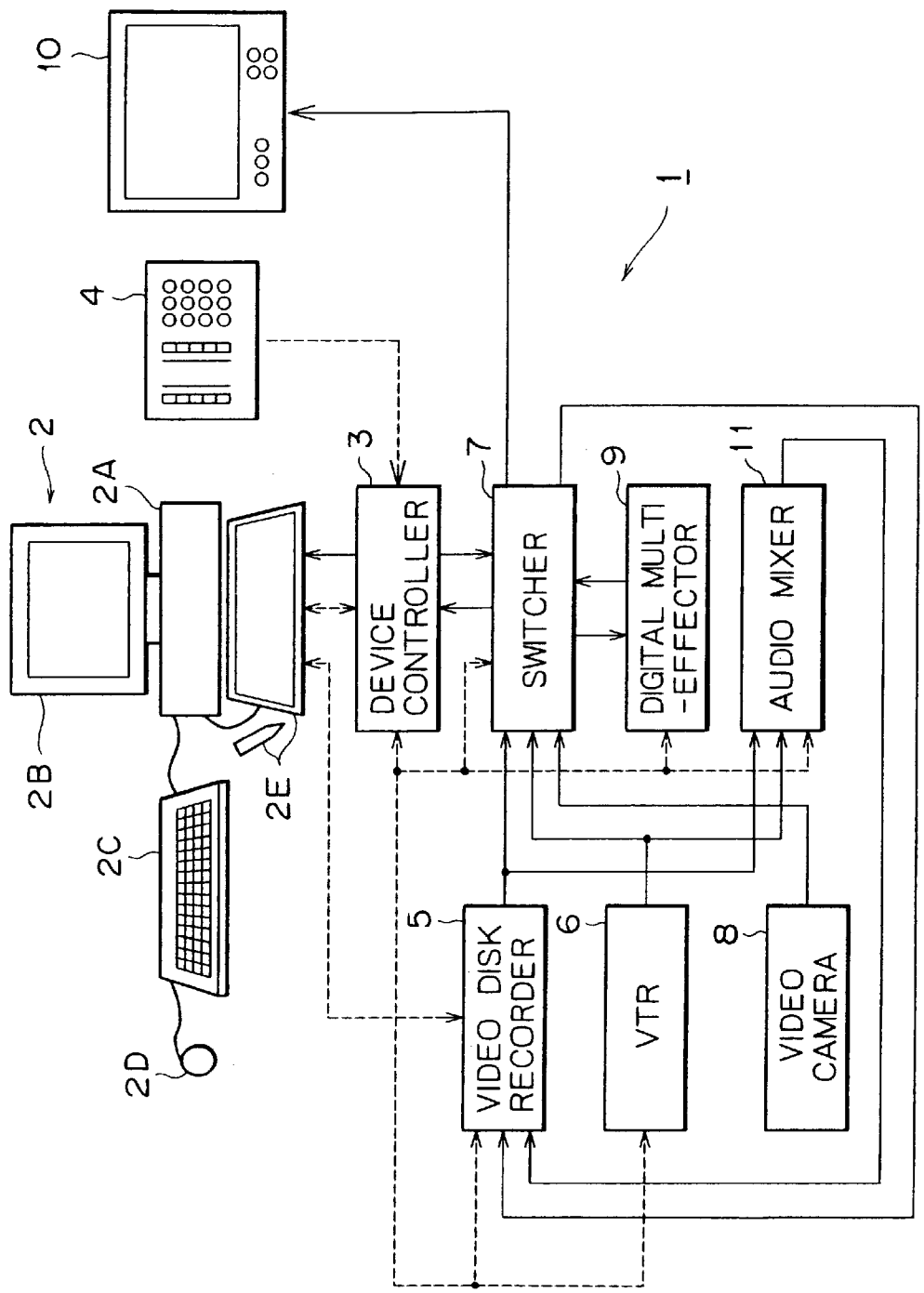
FIG. 1 is a block diagram showing the configuration of an editing system where the present invention is applied.

The present invention is applied to an editing system 1 having a configuration of FIG. 1 for example. The editing system 1 is equipped with a work station 2 which controls the entirety of the system. The work station 2 has a main unit 2A including a CPU (Central Processing Unit), various processing circuits, a floppy disk drive, a hard disk drive and so forth, and also has a display 2B, a keyboard 2C, a mouse 2D and a pen-tablet 2E connected to the main unit 2A. In this system, application software for editing is previously installed in the hard disk drive, and the work station 2 is started to function as an editing computer by booting up the application software under control of an operating system.

When the application software is booted up, graphic icons for a GUI (Graphical User Interface) are displayed on the display 2B, so that a desired editing command can be inputted to the work station 2 by selecting a desired one of the graphic icons on the display 2B by means of the pen-tablet 2E or the mouse 2D mentioned. Also, various numerical data or the like relative to the editing can be inputted to the work station 2 by means of the keyboard 2C.

In response to input of any editing command or numerical data to the work station 2 through manipulation by the user, control data corresponding to such editing command or numerical data are outputted to an undermentioned device controller 3 to thereby achieve control of any component device, which constitutes the editing system 1, via the device controller 3. However, the system 1 is so contrived that, with regard to a video disk recorder 5, partial functions thereof are directly controllable without the necessity of the device controller 3.

Further, video data are inputted to the work station 2 via the device controller 3, so that the image of a material to be edited or the edited image can be displayed on the screen of the display 2B.

The device controller 3 practically controls each device in response to the control data received from the work station 2. An exclusive controller 4 having a dial manipulator or a slide manipulator is connected to the device controller 3, so that gradually changing control data, which are not inputtable by the keyboard 2C, the mouse 2D or the pen-tablet 2E in the work station 2, can be inputted properly in the editing system 1.

In response to the control data obtained from the work station 2 or the exclusive controller 4, the device controller 3 controls the device corresponding to the received control data. For example, the device controller 3 instructs the video disk recorder 5 to reproduce desired material or to record the edited material. And in response to the instruction, the video disk recorder 5 reproduces the video and audio data of the desired material recorded on an internal disk recording medium, or records the edited video and audio data on the disk recording medium.

Similarly, the device controller 3 instructs a video tape recorder (VTR) 6 to reproduce desired material. In response to the instruction, the video tape recorder 6 reproduces and outputs the video and audio data of the desired material recorded on an internal video tape. In this editing system 1, the video data recorded in the video tape recorder 6 is once down-loaded to the video disk recorder 5 and then is handled as the video data of the desired material.

The device controller 3 instructs a switcher 7 to select the video data outputted from the video disk recorder 5, the video tape recorder 6 or a video camera 8. In response to the instruction, the switcher 7 selects the input video data of the desired material in compliance with the instruction, and then outputs the selected data to a digital multi-effector 9, or outputs the data to the work station 2 via the device controller 3, or successively selects and joins the input video data of the desired material, or outputs the edited video data to a monitor 10 for displaying the data thereon, or returns the edited video data to the video disk recorder 5 for recording the same.

The device controller 3 instructs the digital multi-effector 9 to execute various effect processes. In response to the instruction, the digital multi-effector 9 processes the input video data of the desired material to cause various effects in compliance with the instruction, such as special effect with mosaic or three-dimensional image conversion, or an effect process to perform transition effect or image composition, and then returns the resultant video data to the switcher 7 again to thereby output the data to the work station 2, the monitor 10 or the video disk recorder 5.

The device controller 3 instructs an audio mixer 11 to edit the audio data outputted from the video disk recorder 5 and the video tape recorder 6. Then the audio mixer 11 mixes the desired audio material in accordance with the instruction and returns the mixed audio data to the video disk recorder 5 again for recording the same.

Thus, in the editing system 1 having such configuration, complicated high-level video data can be easily generated as desired by inputting a desired edit command via the work station 2 and using the video data of various materials recorded in the video disk recorder 5 or the video tape recorder 6. Consequently, it becomes possible for the user to accomplish any editing merely by manipulating the work station 2 without the conventional necessity of directly manipulating the component devices that constitute the editing system.

2. Configuration of Work Station

Figure 2:
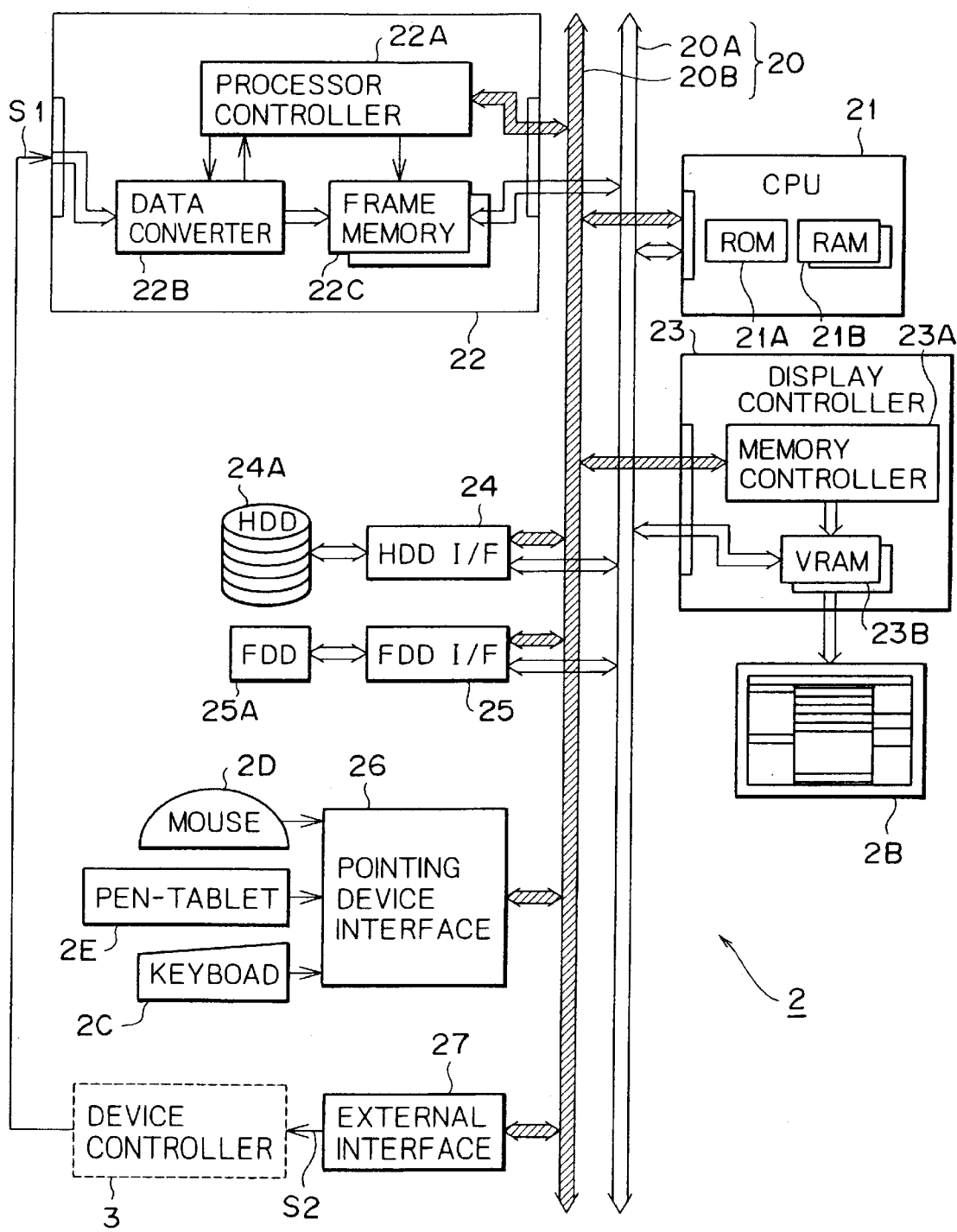
FIG. 2 is a block diagram showing the internal configuration of a work station which is a principal component in the editing system.

In this section, an explanation will be given on the configuration of the work station 2 which is a central apparatus in the editing system 1. As shown in FIG. 2, the work station 2 comprises a system bus 20 for transmitting command data and video data, a CPU 21 for controlling the entirety of the work station 2, a video processor 22 for image-processing the video data S1 supplied from the device controller 3, a display controller 23 for controlling visual display of the video data on the display 2B or graphic display for the GUI, an HDD interface 24 for controlling a local hard disk drive (local HDD) 24A, an FDD interface 25 for controlling a floppy disk drive (FDD), a pointing device interface 26 for generating a control command in response to the command obtained from the pointing device such as keyboard 2C, mouse 2D or pen-tablet 2E, and an external interface 27 equipped with a software driver for sending control data S2 to the device controller 3.

The system bus 20 is used for transmission of video data, command data or address data in the work station 2, and it comprises an image data bus 20A for transmitting video data, and a command data bus 20B for transmitting command data or address data.

To the image data bus 20A, there are connected the video processor 22, display controller 23, HDD interface 24 and FDD interface 25. The CPU 21, video processor 22, display controller 23, HDD interface 24 and FDD interface 25 transmit the video data via the image data bus 20A.

Meanwhile to the command data bus 20B, there are connected the CPU 21, video processor 22, display controller 23, HDD interface 24, FDD interface 25, pointing device interface 26 and external interface 27 (i.e., all blocks in the work station 2 are connected), and these blocks transmit the command data and address data via the command data bus 20B.

The CPU 21 is a block for controlling the entirety of the work station 2, and it has a ROM 21A to store the operating system of the work station 2, and a RAM 21B to store the up-loaded application software and database. In starting the work station 2, the CPU 21 operates in accordance with the operating system stored in the ROM 21A to thereby start the work station 2. When booting up the application software under the operating system being booted, the CPU 21 first reads the application software recorded on the hard disk of the hard disk drive 24A, then up-loads the same in the RAM 21B, and executes the up-loaded application software.

The application software is divided per function into modules, which are broadly classified, as will be described in detail later, into an edit module for joining materials for example, a composition module for compositing materials by superposition or the like, a special effect module for causing special effect in material by three-dimensional image conversion or the like, and a control module for managing start of such modules or transfer of data between the modules. More specifically, upon boot of the application software in this editing system, first the control module is started, and in response to an edit instruction from the user, the corresponding module (e.g., edit module, composition module or special effect module) is started under management of the control module to execute the desired editing instructed by the user.

The video processor 22 is a block for receiving the video data S1 of SDI (Serial Digital Interface) standard inputted to the work station 2, then converting the video data S1, and temporarily buffering the converted video data. More concretely, the video processor 22 comprises a processor controller 22A to control the entirety of the video processor 22, a data converter 22B which extracts the composite video signal from the payload of the received video data S1 and converts the composite video signal into digital component video data, and a frame memory 22C to temporarily store the video data of several frames sent from the data converter 22B.

The processor controller 22A sends a control signal to the data converter 22B, thereby controlling the operation of data conversion performed by the data converter 22B and further enabling the data converter 22B to extract a time code from the video data S1. The processor controller 22A sends a control signal also to the frame memory 22C, thereby controlling the read/write timing of the frame memory 22C and the read/write address therein. With regard to the read timing, the processor controller 22A controls the read timing of the frame memory 22C in such a manner that the time code sent to the display controller 23 corresponds to the video data (frame data).

The data converter 22B converts the composite video signal into digital component video data in accordance with the control signal sent from the processor controller 22A. The time code is extracted during this conversion. The video data thus obtained through conversion is sent to the frame memory 22C as described, and the extracted time code is sent to the processor controller 22A.

The frame memory 22C temporarily stores the video data supplied from the data converter 22B. The read/write timing of the frame memory 22C is controlled by the processor controller 22A as described. The frame memory 22C comprises at least two frame memories which are capable of storing the video data of at least two frames.

The video data stored in the frame memory 22C is read under control of the processor controller 22A. In this case, the pixels of the video data stored in the frame memory 22C are read while being skipped partially at predetermined intervals instead of being read wholly, whereby the image size is reduced to be smaller than that of the original image. The video data thus converted to the smaller image size is sent to the display controller 23 via the image data bus 20A, so as to be displayed in a predetermined area of the display 2B for confirmation of the material or the editing result.

The display controller 23 is a control block for controlling the data to be displayed on the display 2B. The display controller 23 has a memory controller 23A and a VRAM (Video Random Access Memory) 23B. The memory controller 23A controls the read/write timing of the VRAM 23B in accordance with internal synchronism of the work station 2. In the VRAM 23B, the video data sent from the frame memory 22C of the video processor 22 and the image data generated by the CPU 21 are stored in response to the timing control signal from the memory controller 23A. The video data and the image data thus stored in the VRAM 23B are read out therefrom in response to the timing control signal obtained from the memory controller 23A according to the internal synchronism of the work station 2 and then are displayed on the display 2B.

In this case, the graphic display based on the image data is the one for the GUI. For example, the image data sent from the CPU 21 to the VRAM 23B represents a window, a cursor, a scroll bar or an icon indicating the relevant device.

Thus, such image data and video data are displayed on the screen of the display 2B in the work station 2, hence visually representing thereon the image that signifies a GUI for the user's manipulation, the material or the editing result. The HDD interface 24 is an interface block for communicating with a local hard disk drive 24A provided in the work station 2. The HDD interface 24 and the hard disk drive 24A communicate mutually in conformity with the SCSI (Small Computer System Interface) transmission format.

Application software to be booted in the work station 2 is installed in the hard disk drive 24A, and when this application software is executed, it is read out from the hard disk drive 24A and then is up-loaded into the RAM 21B of the CPU 21. And at the end of this application software, various information (e.g., information of the database relative to the edit material) generated by the edit operation and stored in the RAM 21B is down-loaded to the hard disk via the hard disk drive 24A.

The FDD interface 25 is an interface block for communicating with a floppy disk drive 25A provided in the work station 2. The FDD interface 25 and the floppy disk drive 25A communicate mutually in conformity with the SCSI transmission format.

The pointing device interface 26 is an interface block for receiving information from the keyboard 2C, the mouse 2D and the pen-tablet 2E connected to the work station 2. The pointing device interface 26 receives the input information from a button provided on the keyboard 2C and, after decoding the received input information, sends the decoded information to the CPU 21. Similarly, the pointing device interface 26 receives the detected information from a two-dimensional rotary encoder provided in the mouse 2D and also the click information from left and right buttons provided in the mouse 2D (i.e., selective information specified by depression of the button) from the mouse 2D and, after decoding the received information, sends the same to the CPU 21. Further similarly, the pointing device interface 26 receives two-dimensional position data from the pen-tablet 2E and, after decoding the received position data, sends the same to the CPU 21. In accordance with the information thus obtained from the pointing device interface 26, the CPU 21 recognizes the pointed one of the GUI command buttons displayed on the screen of the display 2B, and also recognizes the various data inputted from the keyboard 2C, hence performing proper control corresponding thereto.

The external interface 27 is a block for communicating with the device controller 3 connected to the outside of the work station 2. The external interface 27 has a driver to convert various control commands, such as a reproduce command, a recording command and so forth generated in the CPU 21, into data of a predetermined communication protocol, and then sends the converted control command data S2 via this driver to the device controller 3.

3. Editing Principle in Editing System

In this section, the editing principle in the editing system 1 will be described in the following order.

(3-1) Basic Structure of Editing Application Software

Figure 3:
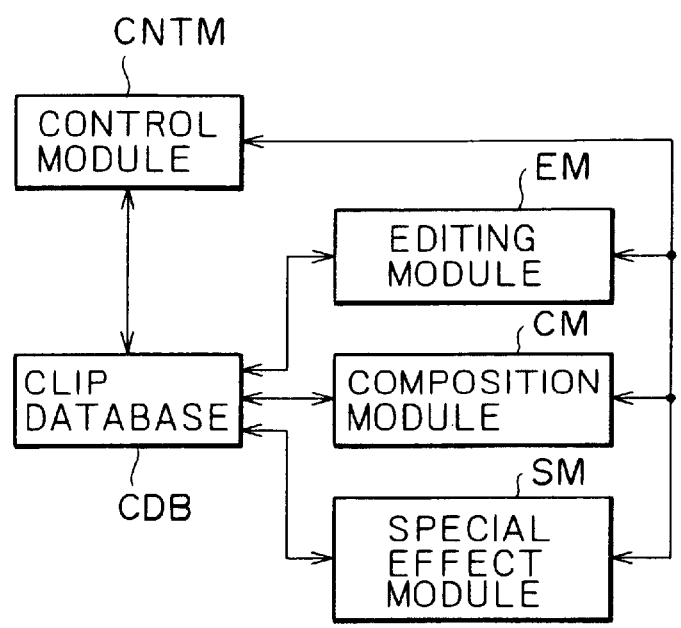
FIG. 3 shows the configuration of modules and a clip database provided in the editing system.

First, an explanation will be given on the basic structure of editing application software prepared in the work station 2. As shown in FIG. 3, the editing application software prepared in the work station 2 is formed into modules per function. Broadly, such modular application software consists of an editing module EM to edit the materials by a joining or similar process, a composition module CM to composite the materials by processing the same through superposition or the like, a special effect module SM to process the materials by causing special effect, and a control module CNTM to manage boot and so forth of such editing module EM, composition module CM and special effect module SM thus modularized per function. When the application software having the above structure is up-loaded from the hard disk drive 24A into the RAM 21B, first the control module CNTM is booted, and subsequently the modules EM, CM and SM are booted in response to the respective instructions from the user under management of the control module CNTM.

A clip database CDB consists of the video disk recorder 5 and the RAM 21B, and stores therein the video data of materials and various data relative to editing. Each of the modules EM, CM and SM reads out the material specified by the user from the clip database CDB, then edits the material in response to the user instruction by means of the hardware such as the aforementioned switcher 7 or digital multi-effector 9, and registers the edited material in the clip database CDB. Further, each of the modules EM, CM and SM registers, in the clip database CDB, the data relative to editing, such as the parameters used for the editing. In the clip database CDB, principally the video data of materials are stored in the video disk recorder 5, while the various data relative to editing are stored in the RAM 21B.

(3-2) Definition of Clip

According to the editing system 1 of the present invention, the materials are handled in units of clip. In this clause, such clip will be defined below. In the editing system 1 of the present invention, one sequence of video moving picture data is defined as clip video data, and data for managing generation of the clip video data is defined as clip management data, and data composed of such clip video data and clip management data is defined as clip. Further in the editing system 1 of the present invention, a material generated by mere extraction from source video data is termed a material clip (MC), and a material generated by editing the material clip is termed a fat clip (FC).

In the editing system 1 of the present invention, a plurality of clips composed of material clips MC and fat clips FC are managed by a hierarchical structure based on the inter-clip relationship. The aspect of such management will now be described below with reference to an example of FIG. 4.

Figure 4:
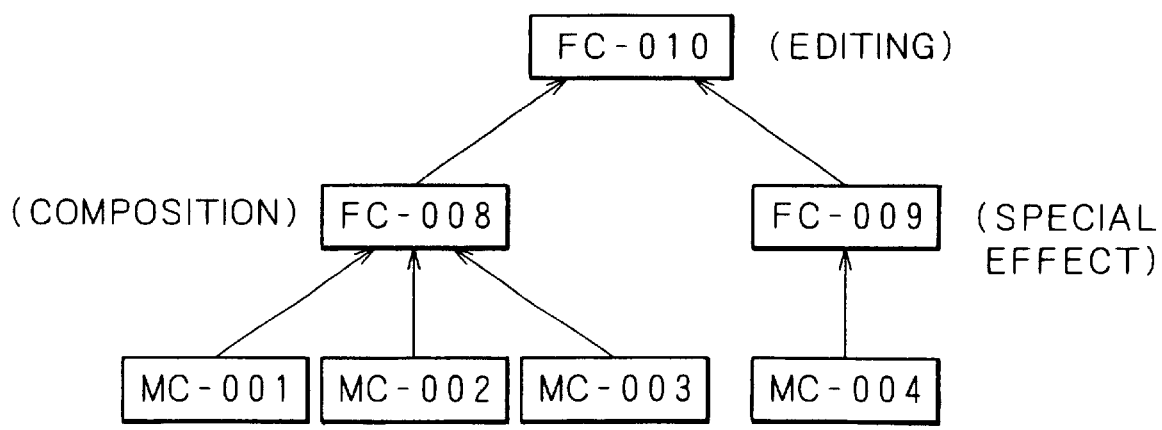
FIG. 4 is a diagram for explaining hierarchical management of clips.

In the example of FIG. 4, fat clip FC-008 is one generated by compositing three material clips MC-001, MC-002 and MC-003. More specifically, the relationship between fat clip FC-008 and three material clips MC-001, MC-002 and MC-003 is positionally up-and-down. In such up-and-down relationship, material clips MC-001, MC-002 and MC-003 are termed lower clips since these material clips are under fat clip FC-008. On the contrary, fat clip FC-008 is termed an upper clip since it is generated by governing the lower clips.

Similarly, fat clip FC-009 is one generated by causing special effect to material clip MC-004. Consequently, material clip MC-004 is a lower clip under fat clip FC-009, and contrary thereto, fat clip FC-009 is an upper clip above material clip MC-004.

Fat clip FC-010 is one generated by editing fat clips FC-008 and FC-009 (in this case, by joining these two clips through wipe for example). Consequently, fat clips FC-008 and FC-009 are lower clips under fat clip FC-010 respectively, and fat clip FC-010 is an upper clip above fat clips FC-008 and FC-009.

The clips are in such up-and-down relationship as described, and in this editing system 1, each clip is managed according to a hierarchical structure on the basis of such inter-clip up-and-down relationship in the clip database CDB. Although the material clip not used at all for the editing is not related to any other clip, such material clip is managed as one without link connection. It is to be understood that the example shown here represents merely an exemplary case, and it is a matter of course that some other combination may also be existent with regard to the up-and-down relationship among the clips.

(3-3) Concept of Composition Process

Figure 5:
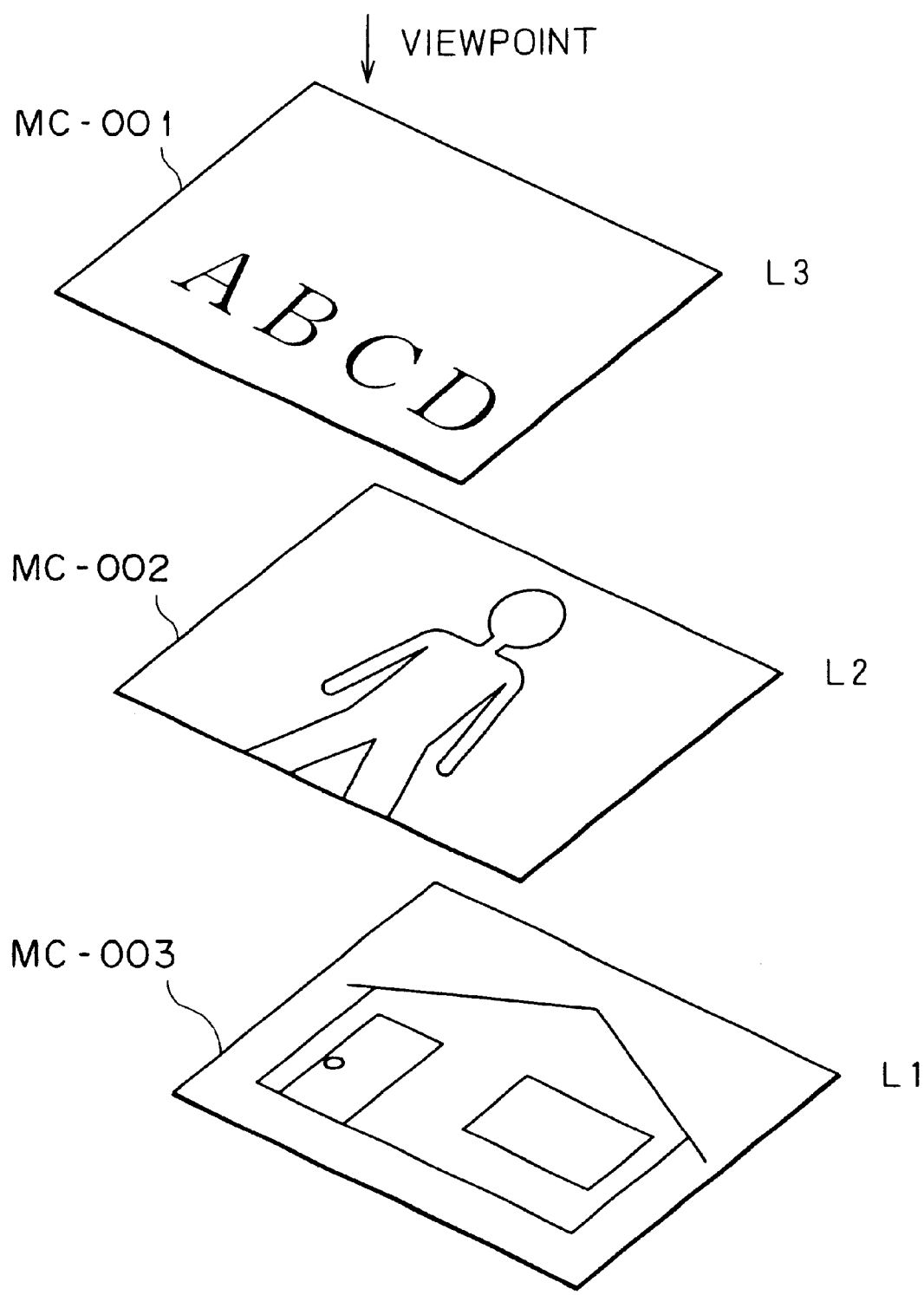
FIG. 5 is a diagram for explaining contents to be composited.
Figure 6:
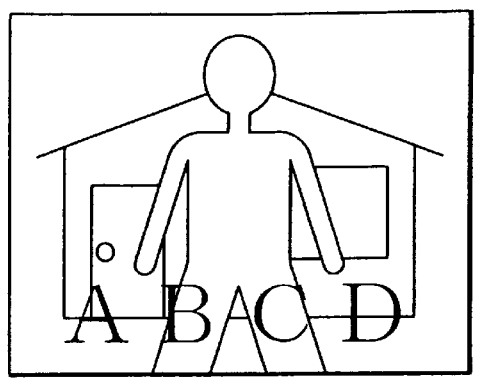
FIG. 6 is a diagram for explaining a video image generated by a compositing process.

In this clause, an explanation will be given on the concept of a composition process executed in the composition module CM. The video image of fat clip FC-008 shown in FIG. 4 is generated by compositing the video images of material clips MC-001, MC-002 and MC-003. The concept of this composition process is illustrated in FIGS. 5 and 6. FIG. 5 illustrates how the video images of three material clips MC-001, MC-002 and MC-003 are composited, and FIG. 6 illustrates the video image of fat clip FC-008 generated by the composition process.

When a plurality of clips are composited in the editing system 1 of the present invention, each clip is regarded as one layer, and the clips are composited by superposing the layers thereof. In the example of FIG. 5, material clip MC-003 is designated as a first layer L1, material clip MC-002 as a second layer L2, and material clip MC-001 as a third layer L3, respectively. And in compositing the three material clips assigned to the layers L1, L2 and L3 respectively, the process is executed by superposing the layers L2 and L3 successively on the layer L1 as a lowermost one. More specifically, the video image (e.g., image representing a person) of material clip MC-002 designated as the second layer L2 is superposed on the video image (e.g., image representing a background) of material clip MC-003 designated as the first layer L1, whereby a composite video image is formed, and subsequently the video image (e.g., image representing characters) of material clip MC-001 designated as the third layer L3 is superposed on the composite video image. As a result of such process, there is formed a fat clip FC-008 of the composite video image where the three materials are mutually superposed, as illustrated in FIG. 6.

The example of FIG. 5 shows an exemplary case of compositing material clips MC-003, MC-002 and MC-001 assigned respectively to the three layers L1, L2 and L3. However, in the editing system 1 of the present invention, the number of layers is not limited to any specific value alone.

4. GUI Picture on Display

An explanation will now be given on the GUI picture which is displayed, when each module is booted, on the screen of the display 2B in the work station 2.

(4-1) Structure of Main Window

Figure 7:
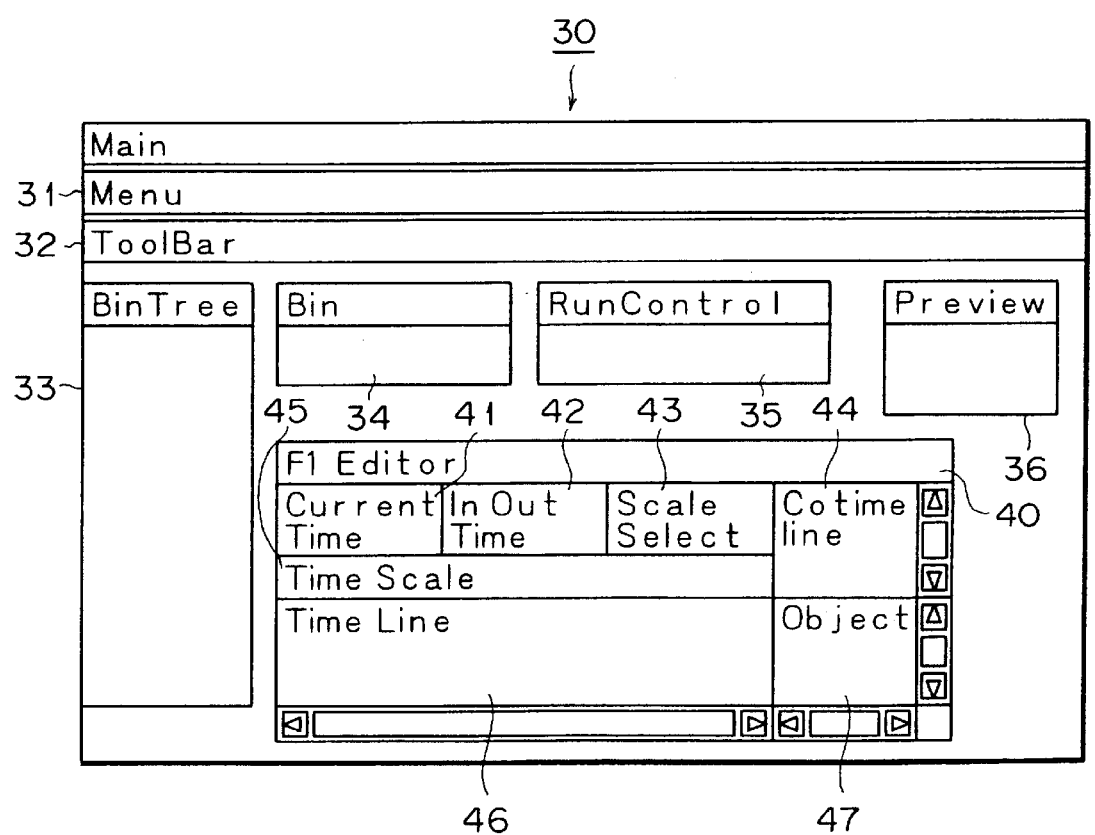
FIG. 7 is a diagram for explaining a menu window displayed on a display screen of the work station.

As shown in FIG. 7, a main window 30 is displayed on the screen of the display 2B. The main window 30 includes a menu window 31 indicating a menu of functions required for editing, a tool bar window 32 indicating a menu of only the functions used frequently, and a bin tree window 33. In compliance with additional requirements, the main window 30 further includes a bin window 34, a run control window 35, a preview window 36 for previewing and confirming the images of material clips MC and so forth prior to editing the same, and an editor window 40 for producing a fat clip FC.

The menu window 31 has menus of all functions required for editing the images, such as a new menu for newly forming a fat clip FC, a save menu for saving the new fat clip FC thus formed with a name, and an interim make menu for generating an interim fat.

The bin tree window 33 indicates, with a tree structure, the locations of the material clips MC and the fat clip FC in the bin window 34.

In the bin window 34, there are contained the material clips MC of various images to be edited for cutting and so forth, the fat clip FC already edited to a certain degree, and the objects for processing the images.

The run control window 35 is used for moving the position of an undermentioned current bar which indicates the current time of reproduction. A detailed explanation thereof will be given later.

The preview window 36 is an area for displaying the image based on the video data of the material clip MC or the fat clip FC in response to manipulation of an unshown preview button, view button, all preview button or all view button. Due to the provision of such display area, it becomes possible for the user to confirm, during his editing work, the video image of the material clip MC or the fat clip FC generated as a result of the editing.

(4-2) Structure of Editor Window

The editor window 40 is used for handling a fat clip FC, i.e., for generating a fat clip. As shown in FIG. 8, the editor window 40 has a current time area 41 for displaying the current time and so forth, an in-out time area 42 for displaying the times of an editing start point and an editing end point, a scale select area 43, a co-time line 44, a time scale area 45, a time line 46 for displaying and editing the temporal positions of the objects, and an object area 47 for displaying the objects which indicate the flow of data.

In the current time area 41, the current time (e.g., "00:00:01:02"=0 hour:0 minute:1 second:2 frames) is displayed. This current time indicates the time when the current time bar 51 is on the time line 46. The position of the current time bar 51 can be changed by using the aforementioned run control window 35.

As shown in FIG. 9, the run control window 35 consists of ten buttons displayed by the GUI. Each button has a function of changing the current bar position as follows when it is clicked.

A top button 201 moves the current time bar 51 to the top fat clip FC. A previous key frame (KF) button 202 moves the current time bar 51 to the previous key frame KF immediately before the time being indicated now by the current time bar 51. A previous frame button 203 moves the current time bar 51 to the frame immediately before the time being indicated now by the current time bar 51. A stop button 204 stops the motion of the current time bar 51 instantly. A run button 205 moves the current time bar 51 at a one-fold speed. A next frame button 206 moves the current time bar 51 to the frame immediately after the time being indicated now by the current time bar 51. A next key frame (KF)

button 207 moves the current time bar 51 to the key frame immediately after the time being indicated now by the current time bar 51. A goto button 208 moves the current time bar 51 to the key frame KF of the specified key frame number or to the specified time. An end button 209 moves the current time bar 51 to an end portion of the last fat clip FC. A create key frame (KF) button 210 creates a new key frame KF at the position (time) being indicated now by the current time bar 51. In this manner, it is possible to execute control of the clips and also control relative to the key frames KF.

In the in-out time area 42, there are displayed the in-point time (e.g., "00:00:01:02") corresponding to the editing start point, and the out-point time (e.g., "00:00:01:22") corresponding to the editing end point. Such in-point and out-point indicate, respectively, the top and the end of the selected material clip MC or fat clip FC which is a subject to be edited. In each layer L on the time line 46, the range covering from the in-point to the out-point is termed a "cell".

The scale select area 43 is used for setting a temporal dimension (scale) of the time line 46. As shown in FIG. 8, there are "Frame" for setting a scale of 1 frame on the time line 46, "Second" for setting a scale of 1 second, and "Min" for setting a scale of 1 minute. "Frame" has four check boxes which denote, from the left in order, 1 frame, 2 frames, 5 frames and 10 frames respectively as a unit time. "Second" has five check boxes which denote, from the left in order, 1 second, 2 seconds, 5 seconds, 10 seconds and 20 seconds respectively as a unit time. And "Min" has four check boxes which denote, from the left in order, 1 minute, 2 minutes, 5 minutes and 10 minutes respectively as a unit time.

Now each display step per unit time will be described below with reference to a time scale table shown in FIG. 10. For example, when the check box relative to a unit time of 1 frame in "Frame" is checked as shown in FIG. 8, a thumbnail picture is displayed per frame in the video data layer L, and the show time step displayed as a unit step indicates 5 frames. A term "thumbnail picture" means a simple image displayed in the relevant layer L where the material clip MC of the image is set. For example, the image displayed in the layer L3 in FIG. 8 corresponds to a thumbnail picture. The aspect ratio of the thumbnail picture is 4:3, so that when each layer of the time line 46 has a width of 30 pixels for example, the thumbnail picture becomes a reduced image of 40×30 pixels. In this case, since "00:00:01:05" is displayed next to "00:00:01:00" in the time scale area 45, the image is displayed in a unit of 5 frames. Similarly according to FIG. 10, when the check box relative to a unit time of 2 seconds in "Second" is checked for example, a thumbnail picture is displayed per 60 frames in the video data layer L, and the displayed show time step indicates 10 seconds.

The co-time line 44 displays the edit contents specified by the time line 46. In this case, it is impossible, on the time line 46, to display the entire edit contents simultaneously due to some restrictions of the screen, so that a reduced graphic image representative of the edit contents is displayed on the co-time line 44, hence enabling the user to easily grasp which of the edit contents is specified out of the whole. For example, if the user specifies such edit contents as to composite some material clips MC on the time line 46, then a graphic image, where bar graphic images representing the specified clips in the respective layers are superposed, is displayed on the co-time line in conformity with the edit contents.

Consequently, it becomes possible for the user to grasp the whole aspect of the specified edit content while viewing the displayed image and to easily grasp that the content indicates a process of compositing some clips.

The time scale area 45 includes a preview area 45a and an in-out area 45b, where the aforementioned time per unit step is displayed. In the preview area 45a, there is displayed, when an unshown preview button is manipulated, a blue bar indicating a range of the video data of the subject image to be previewed. Meanwhile in the in-out area 45b, there is displayed a yellow bar which indicates a range from the editing start point to the editing end point.

The time line 46 is an area for specifying, in regard to the respective layers, subject clips to be composited and edited. In this editing system 1, any clips can be specified individually as materials to be composited. With respect to the time line 46, the display range is limited, and therefore it is impossible to display the entire layers L simultaneously. However, since the time line 46 can be vertically scrolled by manipulating a scroll button displayed at the right end of the time line 46, it is actually possible for the user to selectively display any desired layer. In the time line 46, clips as materials to be composited correspond to the individual layers respectively.

In the object area 47, there are displayed objects 52 which represent the connections of the layers constituting the time line 46. The individual objects 52 are existent correspondingly to the individual layers.

The objects 52 are affixed to the object area 47 by drag and drop from the bin window 34. In a vertical direction, the objects 52 are positioned in units of rows (in units of layers) of the time line 46, while in a horizontal direction, the objects 52 can be positioned freely.

5. Method of Manipulation (5-1) Start of Editor Window

As already mentioned, a plurality of material clips MC and a fat clip FC are contained in the bin window 34 shown in FIG. 7. When the user double clicks the fat clip FC, the editor window 40 for editing the fat clip FC is displayed. Similarly, if the user double clicks any cell (clip) on each layer of the time line 46, the editor window 40 for editing the clip is displayed.

When newly generating a fat clip FC, it is necessary to previously create an empty fat clip FC in the bin window 34. In the following description, an explanation will be given on an exemplary case of creating the entity of a fat clip FC by the use of the editor window 40 for such an empty fat clip FC.

(5-2) Creation of Time Line

Upon start of the editor window 40, an empty time line 46 and an empty object area 47 are displayed as shown in FIG. 7.

Then the user clicks a desired material clip MC (or fat clip FC or object) out of the bin window 34 to thereby select the material clip MC. Due to execution of such a process, a cell of the selected material clip MC is displayed. And when the cell is placed at a desired position by drag and drop, a layer is formed at that position, and the material clip MC is set on the layer. The material clip MC is set in a unit of layer in a vertical direction, or in a unit of frame in a horizontal direction.

After setting the cell in the time line 46, it is possible to move the cell only horizontally by dragging the same. It is further possible to change the set position of the cell through drag and drop of the in-point and out-point thereof.

The length of the cell that represents the clip is equivalent to the clip duration (time from the beginning to the end of the clip). In each cell, characters denoting the clip name or key name are displayed, so that any set clip or key can be recognized at a glance.

(5-3) Creation of Object

The user clicks a desired object out of the bin window 34 to thereby select the object. This object is set when placed at a desired position in the object area 47 by drag and drop. In a vertical direction, the object is set in a unit of layer. That is, the object is set on a horizontal line of the relevant layer.

Even after setting the object in the object area 47, it is possible to move the object by dragging the same. In this manner, a plurality of objects are settable in the object area 47.

When a plurality of objects are thus set in the object area 47, next the objects need to be connected.

Figure 11:
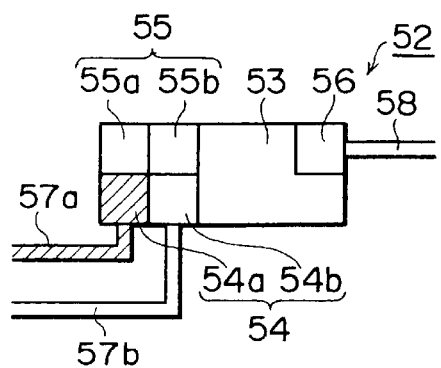
FIG. 11 is a diagram for explaining the structure of an object provided in an object area in the editor window.

As shown in FIG. 11, an object 52 has input connectors 54 (54*a*, 54*b*), view switches 55 (55*a*, 55*b*) and an output connector 56 in an object body 53, wherein input lines (57*a*, 57*b*) for inputting video data or parameters therethrough are connected to the input connectors 54, and an output line 58 is connected to the output connector 56. The object 52 handles a main one of the input connectors 54 as a main input connector, as will be described in detail later.

When the output connector 56 is clicked, the operation proceeds to a wiring mode which starts from the output connector 56. And upon click of the input connector 54 in some other object 52, these connectors are mutually connected to terminate the wiring mode. Although an explanation has been given here on an example of connection with the output connector 56 as a start point, it is also possible to achieve another case of connection with the input connector 54 as a start point.

Then video data or parameters are inputted from below the object body 53 to the object 52 thus connected. Subsequently, the object 52 outputs the video data or parameters from the right of the object body 53. The colors of the input lines 57 and the output line 58 are different depending on the kinds of signals. For example, video data input/output lines are blue, key input/output lines are red, video data and key input/output lines are magenta, and parameter input/output lines are green.

Figure 12:
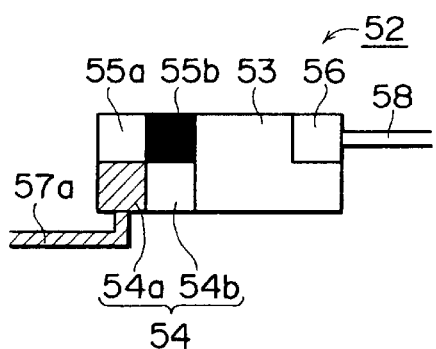
FIG. 12 is another diagram for explaining the structure of the above object.

For example, when the view switch 55*b* is clicked, the input connector 54*b* and the input line 57*b* connected thereto disappear as shown in FIG. 12. However, this merely signifies that the input line 57*b* is no longer displayed, and the relation to the other object connected via the input line 57*b* still remains unchanged. Therefore, in case there are many objects 52, the object configuration can be displayed simply by clicking the view switch 55.

Figure 13:
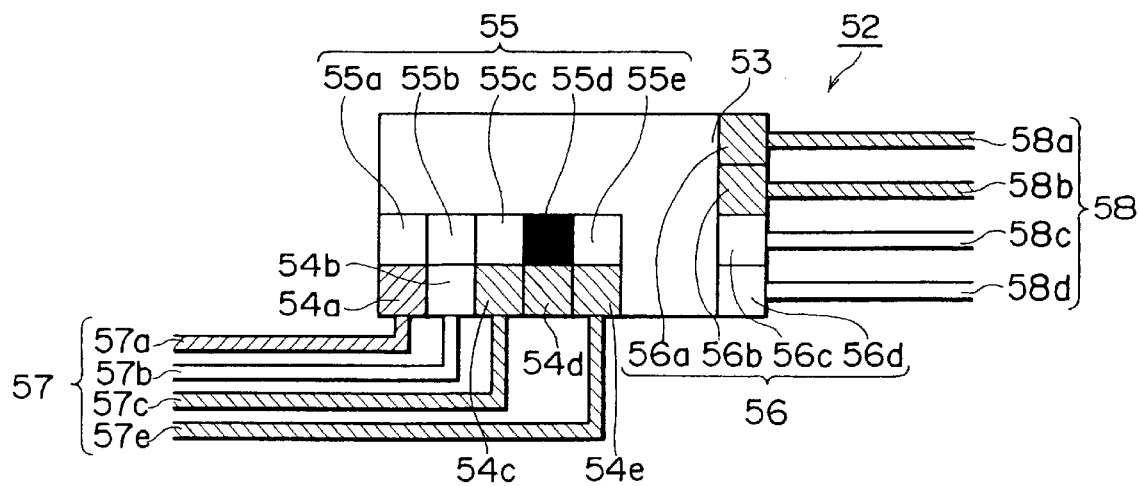
FIG. 13 is a further diagram for explaining the structure of the above object.

FIG. 13 shows an object 52 in a state where many input lines 57 and output lines 58 are connected to its object body 53. The object 52 is connected to unshown other objects via input lines 57*a*–57*c* and 57*e*. Due to click of the view switch 55*d*, the input line connected to the input connector 54*d* is not displayed although being still existent. Further, the object 52 has four output connectors 56*a*, 56*b*, 56*c* and 56*d*, to which output lines 58*a*, 58*b*, 58*c* and 58*d* are connected respectively.

(5-4) Property of Signal

Upon double click of the input connector 54, there is displayed a dialog box of the signal of the input line 57 connected to the input connector 54. For example, when the input connector 54*a* in the object 52 shown in FIG. 11 is double clicked, a dialog box 60 of the signal inputted to the input connector 54*a* is displayed as shown in FIG. 14.

The dialog box 60 has a video check box 61 indicating that the signal inputted to the input connector 54*a* is video data, a key box 62 indicating that the input signal is a key signal, and a video-and-key check box 63 indicating that the input signal is a video and key signal. The dialog box 60 clearly indicates the kind of the signal inputted to the input connector 54*a* by attaching a check mark to one of the three check boxes. The example of FIG. 14 signifies that the signal supplied to the input line 57 is video data.

However, when the dialog box 60 is open, some other check box such as the key check box for example may be clicked and given a check mark, whereby the signal to the input line 57 is changed to a key signal.

In case the signal supplied to the input connector 54*a* is a parameter, the dialog box 60 may indicate the content of such a parameter, or may display "3D Transform", which is a three-dimensional parameter, as shown in FIG. 15 for example.

Upon double click of the object body 53 of the object 52, there is displayed, as shown in FIG. 16, an object dialog box 70 which represents the property of the relevant object 52.

The object dialog box 70 is used for displaying and setting the name of the relevant object 52, a list of input connectors 54 and output connectors 56, and parameters not contained in the key frame. More specifically, the object dialog box 70 displays, as shown in FIG. 16, switch boxes of "Layer 1", "BackGround", "3D" and "Parameter" as signals supplied to the input connector 54, and also displays switch boxes of "Layered" and "Parameter" as signals sent from the output connector 56. If any switch box is clicked and the check mark is removed therefrom, no signal is supplied any longer to the input connector 54 corresponding to that switch box. And if the same switch box is clicked again and a check mark is attached thereto, an input signal is permitted to be supplied to the input connector 54.

The object dialog box 70 further has a bypass switch box 71. This bypass switch box 71 is used for selectively bypassing the input signal received from the aforementioned main input connector 54 of the object 51. More specifically, upon check of the bypass switch box 71, the object 52 bypasses the input signal, which is supplied to the main input connector 54, to the outside without processing the same.

6. Generation of Fat Clip FC (6-1) Visualization of Character

Next, an explanation will be given on a case of generating a fat clip FC to visualize a character by the use of a time line 46 and an object of a simplified structure shown in FIG. 17. The time line 46 consists of a layer L1 and a layer L2. The layer L1 is used for generating a character image from character data. The layer L2 has three key frames KF and is used for outputting predetermined character data at a predetermined time. In this example, key frames KF1, KF2 and KF3 are character data which express "today", "weather" and "fine" respectively.

Objects are provided correspondingly to the layers L1 and L2. The first object 71 corresponds to the layer L2 and, at a predetermined time, supplies the character data "today", "weather" and "fine" of the three key frames KF1–KF3 to the second object 72 via respective output connectors. The second object 72 corresponds to the layer L1, and generates character images successively on the basis of the character data, and then outputs the same to thereby create a telop caption of "Today weather fine" (literally).

Thus, using the time line and the objects corresponding to the layers of the time line, it becomes possible to achieve temporal management of the images according to the time line, hence realizing easy recognition of the connection relationship between the layers in conformity with the connection relationship between the objects, and consequently enabling the user to perform the editing work with facility.

(6-2) Generation of Interim Fat

The aforementioned editor window 40 executes an editing process using the time line and the objects, and then outputs the edited result, which is obtained from the last object, as a fat clip FC. In case the time line 46 has a multi-layer structure where the number of objects amounts to an extremely great value accordingly, it becomes necessary to confirm which of images is being generated in an intermediate stage of the objects. In order to meet this requirement, an interim fat is generated even with regard to any intermediate object to thereby attain confirmation of the image.

Figure 18:
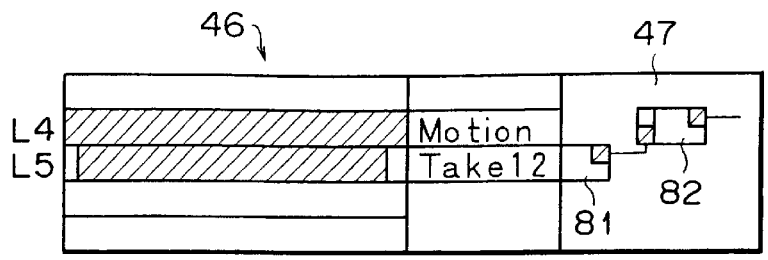
FIG. 18 shows a configuration of a time line and objects for explaining how an interim fat of an object is generated.

Now an explanation will be given on an exemplary case where a time line 46 and objects are so formed as shown in FIG. 18. In the time line 46, a layer L5 is used for a cut image named "Take12", and a layer L4 is used for generating a three-dimensional parameter from the motion of an image. Since this explanation is concerned with generation of an interim fat of an object 82, a description of any other layer is omitted here. Meanwhile, an object 81 corresponds to the layer L5 and supplies the image "Take12" to the object 82. Subsequently the object 82 generates, on the basis of the image supplied thereto, a three-dimensional parameter which represents the motion of the image and then outputs such a parameter.

Figure 19:
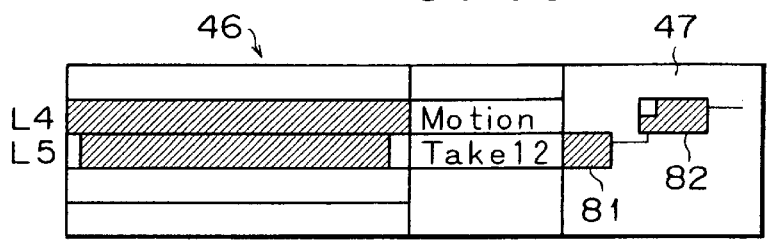
FIG. 19 shows another configuration of a time line and objects for explaining how an interim fat of an object is generated.

If the object 82 is clicked to generate an interim fat and an interim make menu is selected out of the menu window 31 shown in FIG. 7, the object 82 is iconized. When the object 82 is thus iconized, the clips of layers L4 and L5 are turned to be black as shown in FIG. 19, whereby the object 82 cannot be edited. In case the result generated by the interim fat is an image, the output content of the object 82 can be confirmed by previewing the content of the iconized object 82.

When "Save As" (save with a name) is selected out of the menu window 31 in a state where the object 82 is selected (clicked), the content of the object 82 is saved, and a fat clip FC representing the output content of the object 82 is generated.

If the editing work is to be performed again after destruction of the interim fat, the object 82 is clicked, and an unmake menu is selected out of the menu window. Then the interim fat is destroyed, and it becomes possible to edit those subsequent to the object 82.

(6-3) Generation of Fat Clip FC by User Definition

It is also possible to obtain a fat clip FC from the output of any intermediate object, instead of merely generating an interim fat.

Figure 20:
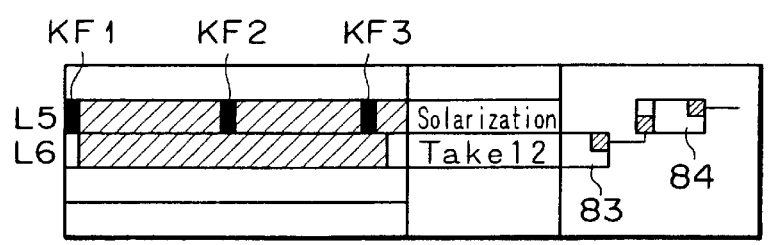
FIG. 20 shows a configuration of a time line and objects for explaining generation of a fat clip which conforms with a user definition.

Now an explanation will be given on an exemplary case where a time line 46 and objects are so formed as shown in FIG. 20. In the time line 46, a layer L6 is used for a cut image named "Take12", and a layer L5 is used for changing the image color in synchronism with the timing of key frames KF1, KF2 and KF3. Here, a description of any other layer is omitted. Meanwhile, an object 83 corresponds to the layer L6 and supplies the image "Take12" to an object 84. Subsequently the object 84 changes the color of the supplied image in synchronism with the timing of each key frame KF.

When "Save As" is selected out of the menu window 31 in a state where the clip of object 84 or layer L5 is selected, a fat clip FC can be generated as an effect having a time line. The fat clip FC thus generated appears in the bin window 34 and can be reused for generating some other fat clip FC.

(6-4) Other Examples

Hereinafter an explanation will be given on an exemplary configuration of objects arranged in a time line 46 and an object area 47, and also on the contents thereof.

Figure 21:
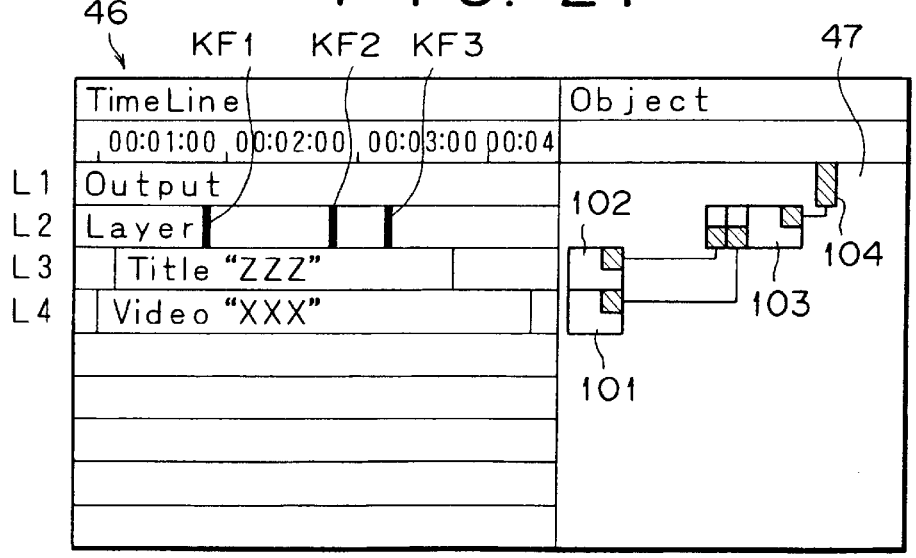
FIG. 21 shows a configuration of a time line and objects in a case of superposing a title image on a video image.

FIG. 21 shows a principal configuration of objects arranged in the time line 46 and the object area 47 in an exemplary case of superposing a title image on a main image. The time line 46 consists of four layers L1 to L4. Layer L4 represents video data of an image "XXX"; layer L3 represents character data of a title image "ZZZ" displayed on the image "XXX"; layer L2 is used for compositing, in this example, the title image "ZZZ" to the image "XXX"; and layer L1 represents an output.

In the object area 47, there are provided four objects 101–104 which correspond to the four layers respectively. The object 101 is provided just beside the layer L4 correspondingly thereto; the object 102 is provided just beside the layer L3 correspondingly thereto; the object 103 is provided on the horizontal line of the layer L2 correspondingly thereto and is connected to the lines from the objects 101 and 102; and the object 104 is provided on the horizontal line of the layer L1 correspondingly thereto and is connected to the line from the object 103.

At time "00:01:00", the object 101 outputs the video data of image "XXX". Subsequently at time "00:01:10", the object 102 outputs the character data of title image "ZZZ". The object 103 outputs the video data obtained from the object 101, then composites the character data of title image "ZZZ" in synchronism with the timing of key frame KF1 (time "00:01:40"), KF2 (time "00:02:50") and KF3 (time "00:03:15"), and outputs the composited data. The object 104 outputs the video data obtained from the object 103 to the outside.

Thus, the time line 46 manages the time of each layer L, and the objects constitute the relation of connection among the layers L to thereby achieve flexible data processing regardless of the order of the layers L.

Figure 22:
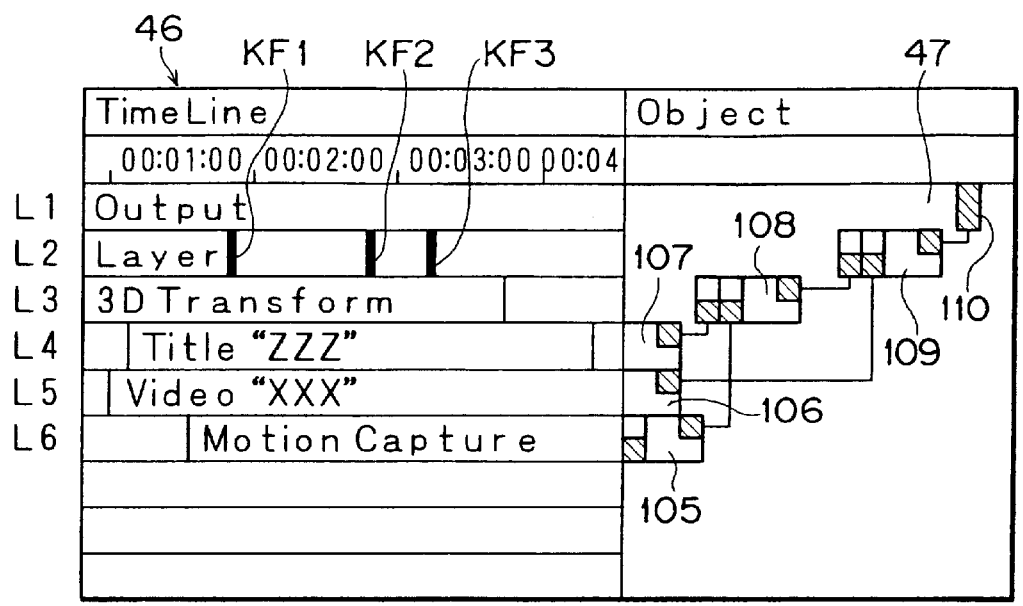
FIG. 22 shows a principal configuration of a time line and objects in a case of superposing a title image on a main image and moving the title image by motion capture.

FIG. 22 shows a principal configuration of a time line 46 and objects in an exemplary case of superposing a title image on a main image and moving the title image by motion capture.

The time line 46 consists of six layers L1 to L6. Layer L6 is a motion capture layer which detects the motion of a subject and outputs a parameter indicative of the detected motion. Layer L3 is a 3D transform layer for moving an input image in accordance with the input three-dimensional parameter. Layers L1 and L2 are the same as the aforementioned layers L1 and L2 shown in FIG. 21. And layers L4 and L5 are the same as the layers L3 and L4 shown in FIG. 21 already mentioned.

In the object area 47, there are provided six objects 105–110 which correspond to the layers L6–L1 respectively. The object 105 captures the motion of one image and then outputs a three-dimensional parameter indicating the captured motion. The object 106 outputs the video data of a main image "XXX". The object 107 outputs the character data of a title image "ZZZ". The object 108 is connected to output lines of the objects 105 and 107. The object 109 is connected to output lines of the objects 106 and 108. The object 110 is connected to the output line of the object 109 and outputs the image obtained from this line to the outside.

The object 108 moves the title image "ZZZ", which is outputted from the object 107, in accordance with the three-dimensional parameter obtained from the object 105, and then supplies the moving title image to the object 109. Subsequently the object 109 outputs the image "XXX" supplied from the object 106, then composites the title image from the object 108 in synchronism with the timing of key frames KF1, KF2 and KF3, and supplies the composited image to the object 110. Thereafter the object 110 outputs the image from the object 109 to the outside.

In this manner, it is possible to composite even a moving title image with facility in addition to mere composition of an ordinary title image to a main image.

Figure 23:
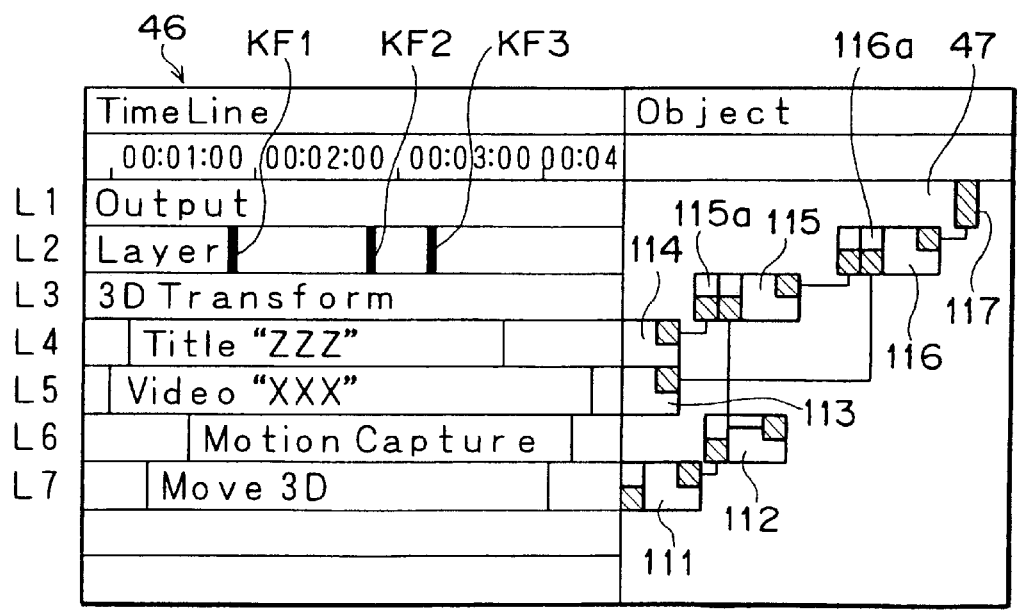
FIG. 23 shows a principal configuration of a time line and objects in a case of superposing a title image on a main image and moving the title image by motion capture and 3D.

FIG. 23 shows a principal configuration of a time line 46 and objects in an exemplary case of superposing a title image on a main image and moving the title image by motion capture and 3D.

The time line 46 consists of seven layers L1 to L7. Layer L7 represents that a subject is moving. Other layers L1–L6 are the same as the aforementioned layers L1–L6 shown in FIG. 22.

In the object area 47, there are provided seven objects 111–117 which correspond to the layers L7–L1 respectively. The object 111 outputs a three-dimensional parameter. The object 112 is connected to an output line of the object 111. The object 113 outputs the video data of a main image "XXX". The object 114 outputs the character data of a title image "ZZZ". The object 115 is connected to output lines of the objects 112 and 114. The object 116 is connected to output lines of the objects 113 and 115. The object 117 is connected to the output line of the object 116 and outputs the image obtained from this line to the outside.

The object 112 outputs a three-dimensional parameter on the basis of the subject motion obtained from the object 111. Subsequently the object 115 moves the title image "ZZZ", which is outputted from the object 114, in accordance with the three-dimensional parameter obtained from the object 112, and then supplies the moving title image to the object 116. Thereafter the object 116 outputs the image "XXX" supplied from the object 113, then composites the title image from the object 115 in synchronism with the timing of key frames KF1, KF2 and KF3, and supplies the composited image to the object 117. And finally the object 117 outputs the image from the object 116 to the outside.

In this manner, it is possible to move the title image, which is to be composited to the main image, with the motion of the subject.

Figure 24:
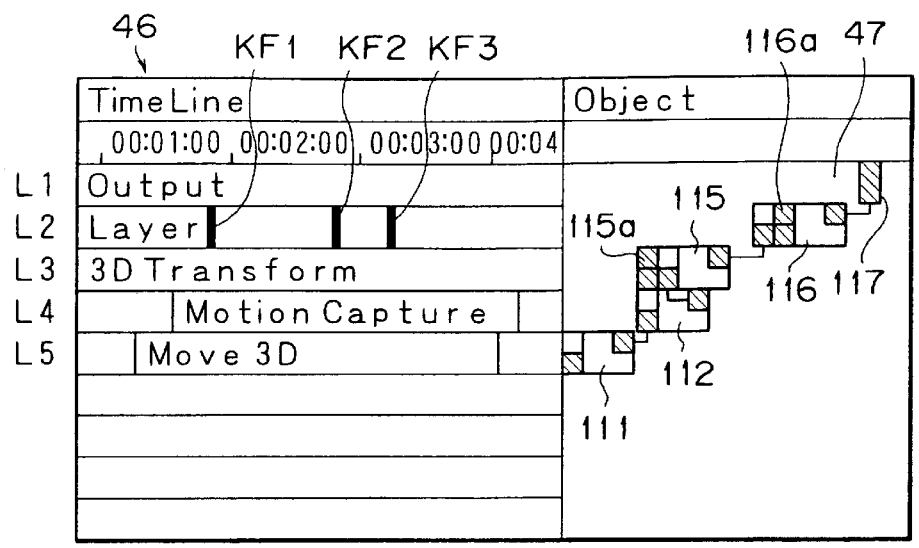
FIG. 24 shows another principal configuration of a time line and objects in a case of superposing a title image on a main image and moving the title image by motion capture and 3D.

FIG. 24 shows a principal configuration of a time line 46 and objects having the same functions as those in FIG. 23. More specifically, in FIG. 23, an object 114 and a layer L4 are erased by clicking a view switch 115a of an object 115, and further an object 113 and a layer L5 are erased by clicking a view switch 116a of an object 116.

Therefore, the time line 46 consists of five layers L1 to L5.

Thus, as a predetermined view switch is clicked, the object and the layer L inputted posterior to the line of the input connector corresponding to the relevant view switch are erased to consequently simplify the displayed contents.

Figure 25:
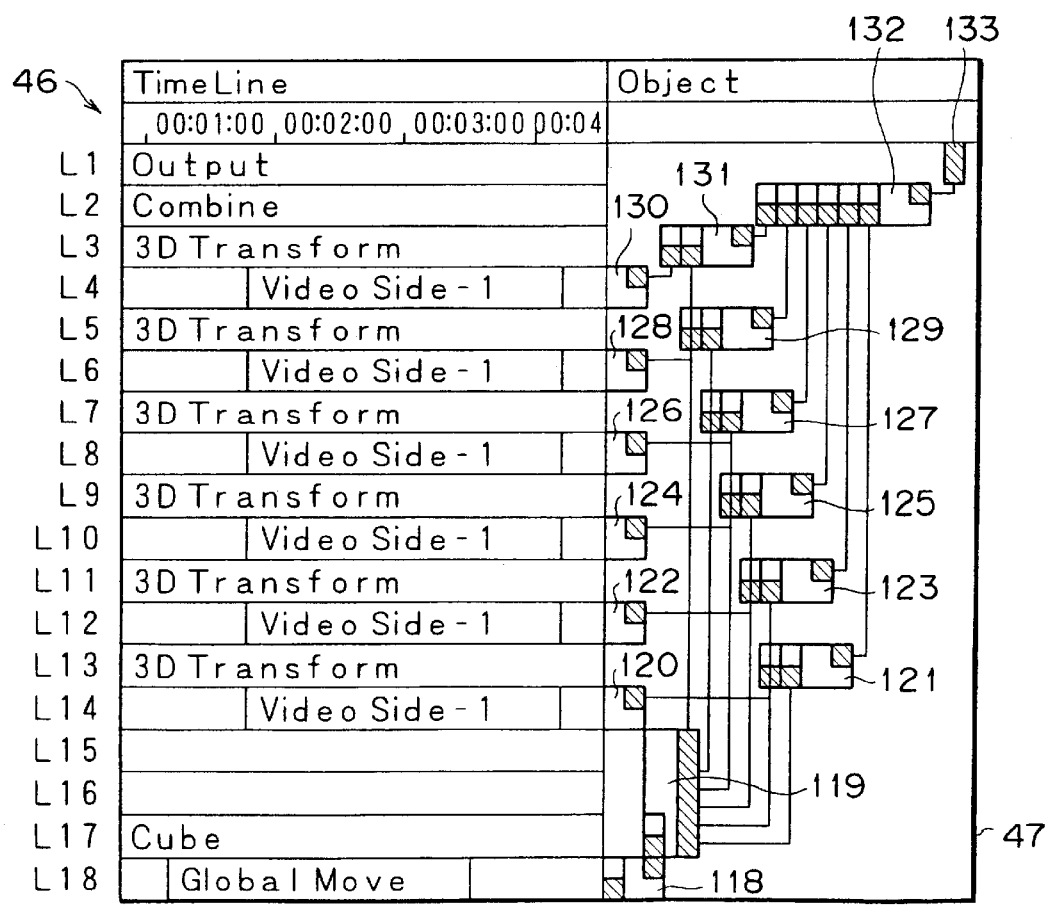
FIG. 25 shows a principal configuration of a time line and objects in a case of displaying a hexahedron.

FIG. 25 shows a principal configuration of a time line 46 and objects in an exemplary case of displaying a hexahedron.

The time line 46 consists of eighteen layers L1 to L18. Layer L18 is a global move layer to indicate the global motion of a cube. Layers L15–L17 are cube layers to indicate parameters of the respective sides of the cube. Layer L14 is a video data layer to indicate the data of "Video Side-1" which represents one side of the cube. Layer L13 is a 3D transform layer to move the image on the basis of three-dimensional parameters. Layers L12, L11, L10, L9, L8, L7, L6, L5, L4 and L3 are the same as the aforementioned layers L14 and L13. Layer L2 is a combine layer to indicate combination of images, and layer L1 is an output layer to execute an output process.

In the object area 47, as shown in FIG. 25, there are provided objects 118–133 which correspond to the layers L18–L1 respectively, wherein an object 119 corresponds to the layers L15–L17.

The object 118 corresponds to the layer L18 and outputs a parameter representing a delay motion. The object 119 corresponds to the layers L15, L16 and L17, and outputs parameters, which represent the six faces of the cube respectively, on the basis of the parameter obtained from the object 118. The object 120 corresponds to the layer L14 and outputs video data of one face of the hexahedron. The object 121 moves one face of the hexahedron in accordance with both the video data from the object 120 and the two parameters from the object 119, and then outputs the video data thereof. The objects 122 and 123, objects 124 and 125, objects 126 and 127, objects 128 and 129, and objects 130 and 131 execute the same processing as the aforementioned objects 120 and 121, respectively. The object 132 corresponds to the layer L2, and combines the video data of the six faces of the hexahedron obtained from the objects 121, 123, 125, 127, 129 and 131 respectively, and then outputs the combined video data. The object 133 corresponds to the layer L1 and outputs the moving cubic image obtained from the object 132.

In this manner, it is possible to output not only the title image but also the combined image after moving the individual images and combining the same.

Figure 26:
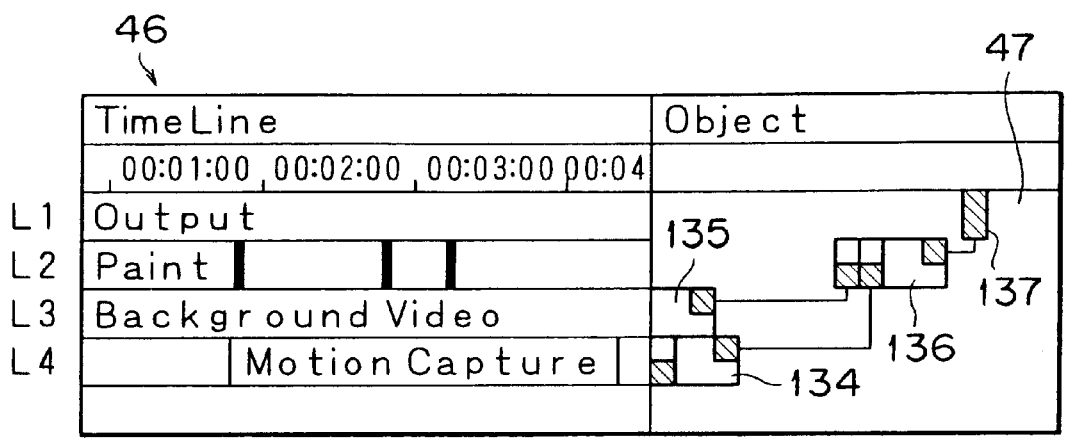
FIG. 26 shows a principal configuration of a time line and objects in a case with a paint function of giving desired colors to the picture on a screen either entirely or partially.

FIG. 26 shows a principal configuration of a time line 46 and objects in an exemplary case with a paint function of giving desired colors to the picture on the screen either entirely or partially.

The time line 46 consists of four layers L1 to L4. Layer L4 is a motion capture layer mentioned. Layer L3 is a background video layer for a background video image. Layer L2 is a paint layer for giving a desired color to the image. And layer L1 is an output layer.

In the object area 47, there are provided objects 134–137 which correspond to the layers L4–L1 respectively. The object 134 corresponds to the layer L4 and outputs a parameter representing the motion of a subject. The object 135 corresponds to the layer L3 and outputs video data of a background image. The object 136 corresponds to the layer L2, and executes such a process as to change the color of the background image obtained from the object 135, in accordance with the parameter outputted from the object 134. The object 137 corresponds to the layer L1 and outputs the color-changed background image obtained from the object 136 to the outside.

Thus, it is possible to perform change of color and so forth in addition to the subject alone.

Figure 27:
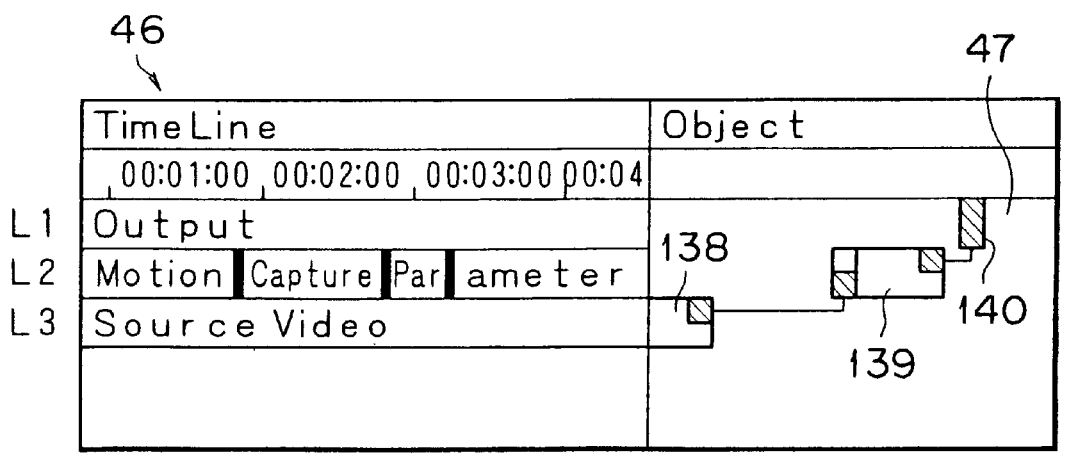
FIG. 27 shows a principal configuration of a time line and objects in a case of generating three-dimensional data.

FIG. 27 shows a principal configuration of a time line 46 and objects in an exemplary case of generating three-dimensional data.

The time line 46 consists of three layers L1 to L3. Layer L3 is a source video layer to indicate the video data of a moving subject from which three-dimensional parameters are to be generated. Layer L2 is a motion capture parameter layer for generating three-dimensional parameters from the video data of the moving subject. Layer L1 is an output layer.

In the object area 47, there are provided objects 138–140 which correspond to the layers L3–L1 respectively. The object 138 outputs the video data of a moving subject. The object 139 generates three-dimensional parameters of the moving subject on the basis of the video data obtained from the object 138 and then outputs the generated parameters. And the object 140 outputs the three-dimensional parameters obtained from the object 139 to the outside.

In this manner, it is possible to perform generation of three-dimensional parameters due to such configuration of the time line 46 and the objects 138–140.

As described above, in the editing system 1 where the present invention is applied, time management of data and parameters is executed by the time line, and the relation of connection among the layers that constitute the time line is indicated by the objects to consequently facilitate the complicated and intricate editing work.

During this operation, it is possible to generate an interim fat outputted from any object in an intermediate process, and thus a fat clip FC conforming with the user definition can be generated to eventually achieve a satisfactory editing work with enhanced facility.

Further, the content of the editing process can be visually grasped with ease by erasing partial objects, and input and output signals to and from each object can be set with facility by displaying the property of the relevant object.

It is to be understood that the present invention is not limited merely to the embodiments mentioned above, and any change or modification in design may be contrived within the scope defined in the appended claims. And it is a matter of course that the structures of the main window 30 and the editor window 40 for example are not limited to the examples shown in FIG. 7 and FIG. 8.

Thus, according to the editing system and the editing method of the present invention, time management is executed with regard to each clip processing layer, and the processed clip obtained from one clip processing layer is further processed by the other clip processing layer which is hierarchically above the foregoing one layer, and then the processed clip obtained from the hierarchically uppermost clip processing layer is outputted as a fat clip, hence raising the freedom degree of the editing process and enabling the user to visually grasp the content of the editing process with facility.

What is claimed is:

1. An editing system for editing a plurality of clips recorded on a random-accessible recording medium, comprising:

a clip processing means having a plurality of clip processing layers to execute a predetermined process for the plurality of clips; and a hierarchy decision means having a plurality of objects corresponding to said clip processing layers respectively, and serving to decide the hierarchy of each clip processing layer by one hierarchical structure which is formed by connecting said objects mutually;

wherein said clip processing means performs time management of each clip processing layer, and any processed clip obtained from a first clip processing layer is further processed by a second clip processing layer which is hierarchically above said first clip processing layer, and the processed clip obtained from a hierarchically uppermost clip processing layer is outputted as a fat clip.

2. An editing system according to claim 1, further comprising a display means wherein the contents processed by said clip processing means are displayed as a time line, and the hierarchical structure formed by said hierarchy decision means is displayed with connections among the objects.

3. An editing system according to claim 1, wherein said display means displays the connections among said objects in different colors changed in conformity with the subjects to be processed by said clip processing layers.

4. An editing system according to claim 1, wherein said plurality of clips comprises:

a plurality of clip video data; and a plurality of clip management data.

5. An editing method of generating an edited fat clip by editing a plurality of clips used as edit units, comprising the steps of:

executing a predetermined process for the plurality of clips by a plurality of clip processing layers;

connecting a plurality of objects provided correspondingly to said clip processing layers, and deciding the hierarchy of each clip processing layer by one hierarchical structure formed through such connections of said objects;

performing time management of each clip processing layer; and processing the clip, which has already been processed by one clip processing layer, by the other clip processing layer which is hierarchically above said one clip processing layer, and outputting, as a fat clip, the processed clip obtained from hierarchically uppermost clip processing layer.

6. An editing method according to claim 5, wherein the contents processed by said clip processing layers are displayed as a time line, and the formed hierarchical structure is displayed with connections among the objects.

7. An editing method according to claim 5, wherein the connections among said objects are displayed in different colors changed in conformity with the subjects to be processed by said clip processing layers.

8. An editing system according to claim 5, wherein said plurality of clips comprises:

a plurality of clip video data; and a plurality of clip management data.

9. An editing system for generating an edited fat clip by editing a plurality of clips used as edit units, comprising:

a clip processing means having a plurality of clip processing layers to execute a predetermined process for the plurality of clips;

a hierarchy decision means having a plurality of objects corresponding to said clip processing layers respectively, and serving to decide the hierarchy of each clip processing layer by one hierarchical structure which is formed by connecting said objects mutually; and an indication means for indicating a desired object;

wherein any processed clip obtained from one clip processing layer in said clip processing means is further processed by the other clip processing layer which is hierarchically above said one clip processing layer, and the processed content obtained from the clip processing layer corresponding to the indicated object is outputted as an interim fat.

10. An editing system according to claim 9, further comprising a display means wherein the contents processed by said clip processing means are displayed as a time line, and the hierarchical structure formed by said hierarchy decision means is displayed with connections among the objects, and the object indicated by said indication means and the layer corresponding to said object are displayed in different colors.

11. An editing system according to claim 9, wherein said clip processing means outputs the interim fat as a fat clip.

12. An editing system according to claim 9, wherein said plurality of clips comprises:

a plurality of clip video data; and a plurality of clip management data.

13. An editing method of generating an edited fat clip by editing a plurality of clips used as edit units, comprising the steps of:

executing a predetermined process for the plurality of clips by a plurality of clip processing layers;

connecting a plurality of objects provided correspondingly to said clip processing layers, and deciding the hierarchy of each clip processing layer by one hierarchical structure formed through such connections of said objects; and processing the clip, which has already been processed by one clip processing layer, by the other clip processing layer which is hierarchically above said one clip processing layer, and outputting, as an interim fat, the processed content obtained from the clip processing layer corresponding to the indicated object.

14. An editing method according to claim 13, wherein the contents processed by said clip processing layers are displayed as a time line, and the formed hierarchical structure is displayed with connections among the objects, and the object indicated by said indication means and the layer corresponding to said object are displayed in different colors.

15. An editing method according to claim 13, wherein said interim fat is outputted as a fat clip.

16. An editing system according to claim 13, wherein said plurality of clips comprises:

a plurality of clip video data; and a plurality of clip management data.

17. An editing system for generating an edited fat clip by editing a plurality of clips used as edit units, comprising:

a clip processing means having a plurality of clip processing layers to execute, with time management, a predetermined process for the subject plurality of clips to be edited;

a hierarchy decision means having a plurality of objects corresponding to said clip processing layers respectively, and serving to decide the hierarchy of each clip processing layer by one hierarchical structure which is formed by connecting said objects mutually; and an indication means for indicating a desired object or clip processing layer;

wherein any processed clip obtained from one clip processing layer in said clip processing means is further processed by the other clip processing layer which is hierarchically above said one clip processing layer, and either the processed content obtained from the clip processing layer corresponding to the object indicated by said indication means, or the processed content obtained from the clip processing layer indicated by said indication means, is outputted as a fat clip.

18. An editing system according to claim 17, wherein said clip processing layers execute a predetermined process for the output fat clip as a subject clip to be edited.

19. An editing system according to claim 17, wherein said plurality of clips comprises:

a plurality of clip video data; and a plurality of clip management data.

20. An editing method of generating an edited fat clip by editing a plurality of clips used as edit units, comprising the steps of:

executing, with time management, a predetermined process for the subject plurality of clips to be edited by a plurality of clip processing layers;

connecting a plurality of objects corresponding to said clip processing layers respectively, and deciding the hierarchy of each clip processing layer by one hierarchical structure which is formed through such connections among the objects;

processing the clip, which has already been processed by one clip processing layer, by the other clip processing layer which is hierarchically above said one clip processing layer; and outputting, as a fat clip, either the processed content obtained from the clip processing layer corresponding to the object indicated by an indication means, or the processed content obtained from the clip processing layer indicated by said indication means.

21. An editing method according to claim 20, wherein said clip processing layers execute a predetermined process for the output fat clip as a subject clip to be edited.

22. An editing system according to claim 20, wherein said plurality of clips comprises:

a plurality of clip video data; and a plurality of clip management data.

23. An editing system for editing plural-channel video data reproduced from a random-accessible recording medium, comprising:

a video processing means for processing the plural-channel video data;

a display means for displaying a plurality of video clips on multi-layers of a time line correspondingly to the plural-channel video data, and also displaying a plurality of objects, which represent a linked state of said plurality of video clips, in such a manner that said objects correspond respectively to said video clips; and a control means for controlling said video processing means in accordance with the linked state represented by said plurality of objects.

24. An editing system according to claim 23, wherein said linked state of said plurality of video data provides an inter-clip relationship.

25. An editing system for editing plural-channel video data reproduced from a random-accessible recording medium, comprising:

a video processing means for processing the plural-channel video data;

a display means for displaying a plurality of video clips on multi-layers of a time line correspondingly to the plural-channel video data, and also displaying a plurality of objects, which represent a linked state of said plurality of video clips, in such a manner that said objects correspond respectively to said video clips; and a control means for controlling the timing of reproduction from said random-accessible recording medium in conformity with the positions of the video clips on said time line, and also controlling said video processing means in accordance with the linked state represented by said plurality of objects.

26. An editing system according to claim 25, wherein said linked state of said plurality of video clips provides an inter-clip relationship.

27. An editing system for editing plural-channel video data reproduced from a random-accessible recording medium, comprising:

a video processing means for processing the plural-channel video data;

a display means for displaying a plurality of video clips on multi-layers of a time line correspondingly to the plural-channel video data, and also displaying a plurality of objects, which represent a linked state of said plurality of video clips, in such a manner that said objects correspond respectively to said video clips; and a means for editing plural-channel source video data reproduced from said random-accessible recording medium in accordance with the linked state represented by said plurality of objects, and then recording the edited video data on said recording medium;

wherein said display means displays icons representative of said edited video data correspondingly to said plurality of objects.

28. An editing system according to claim 27, wherein said linked state of said plurality of video clips provides an inter-clip relationship.

29. An editing system for editing a plurality of video clips generated from source video data, comprising:

a reproduction means for reproducing the source video data recorded on a random-accessible recording medium;

a video processing means for processing said source video data; and an editing means having a graphical user interface to perform an editing operation, and serving to control said reproduction means and said video processing means in accordance with the manipulating operation in said graphical user interface;

wherein said graphical user interface includes a time line of a multi-layer structure for compositing a plurality of video clips generated from said source video data and assigning the video clips to the layers, and also includes an object area for displaying a plurality of objects which represent a linked state of said plurality of video clips; and said objects are icons to indicate the process of composition to be executed by the use of the video clips assigned to the layers.

30. An editing system according to claim 29, wherein said linked state of said plurality of video clips provides an inter-clip relationship.

* * * * *